June 20, 1944.    M. E. LANGE    2,351,687
MACHINE TOOL
Filed April 15, 1941    11 Sheets-Sheet 2

INVENTOR.
MAX E. LANGE
BY
Kwis Hudson & Kent
ATTORNEY.

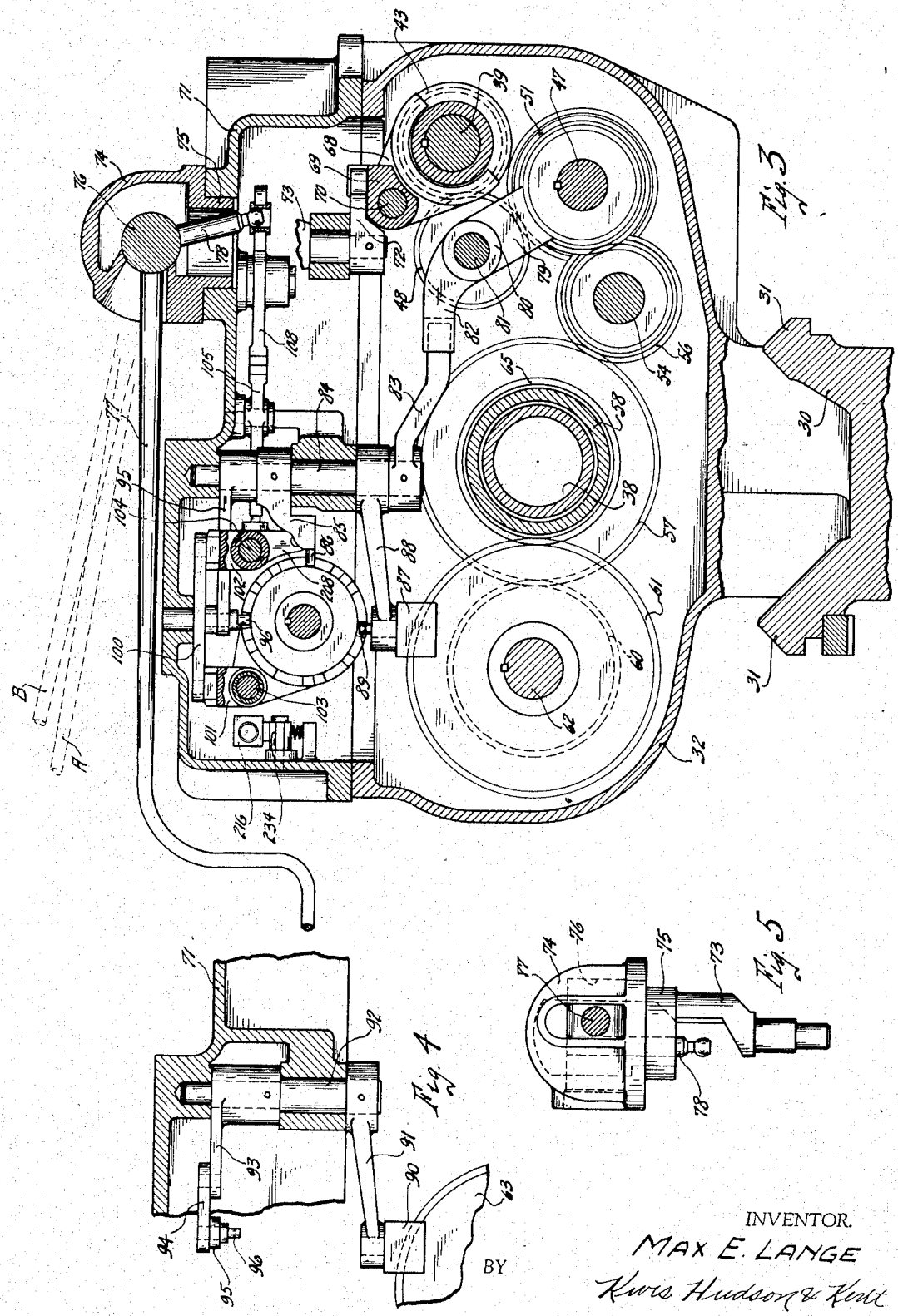

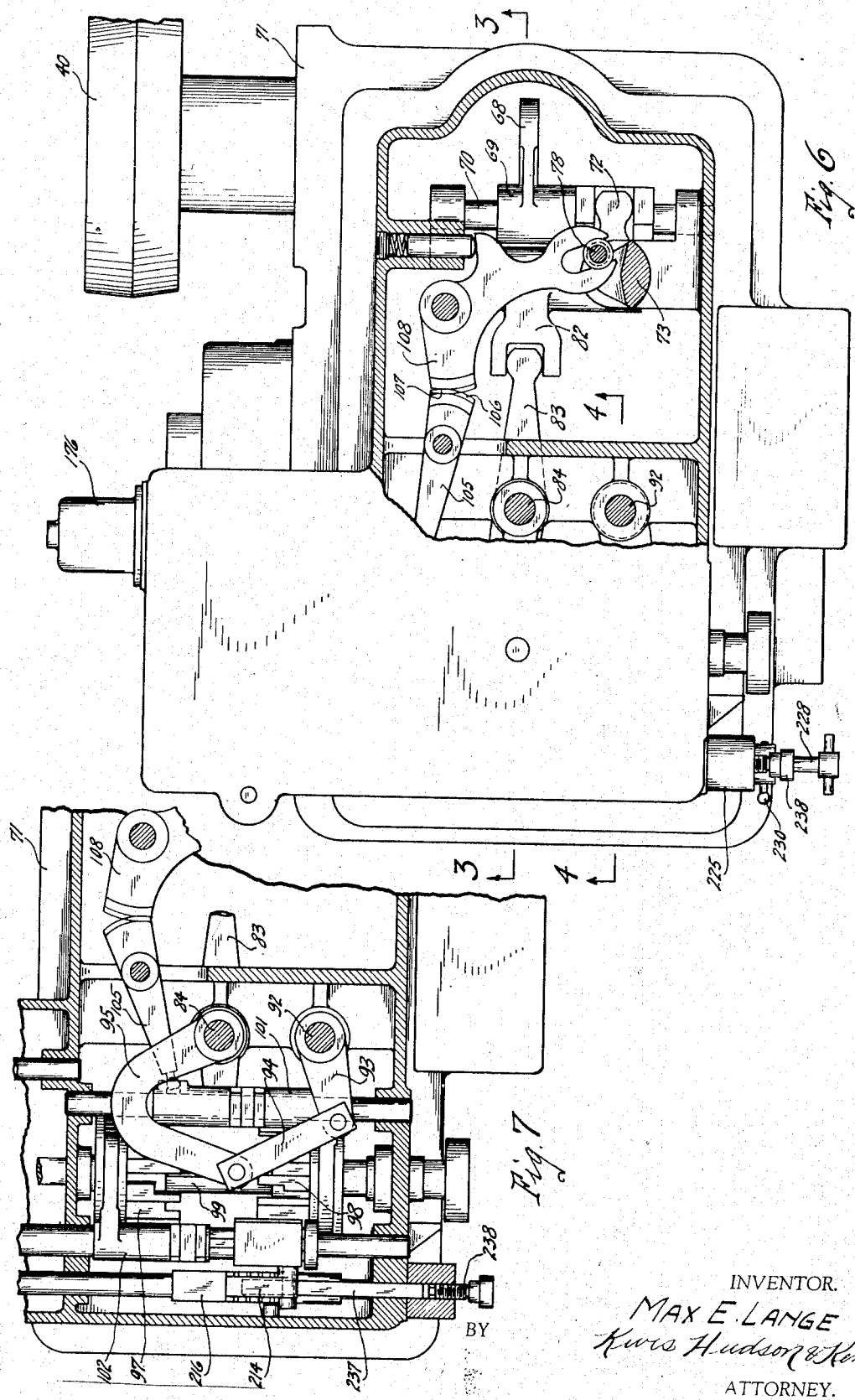

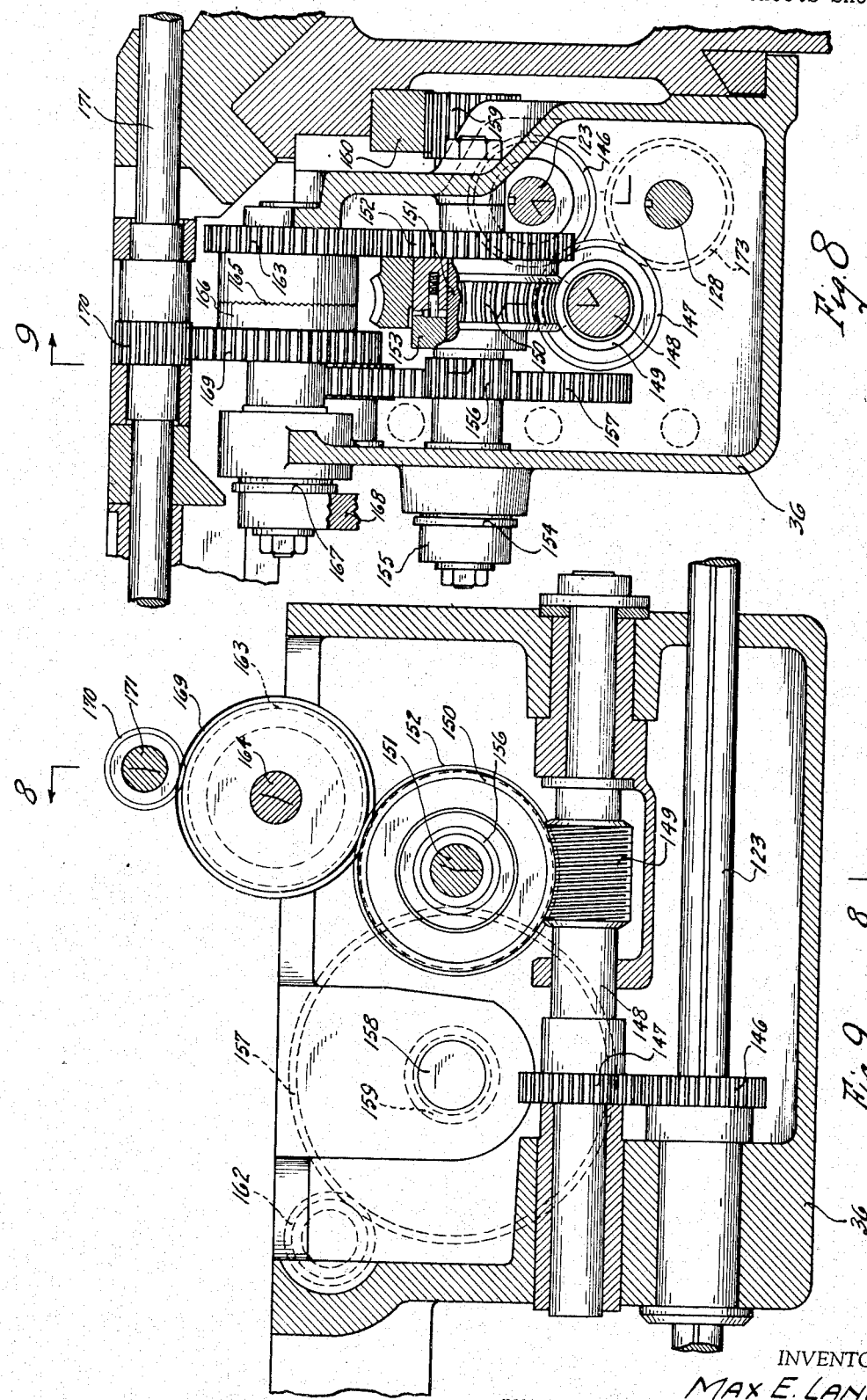

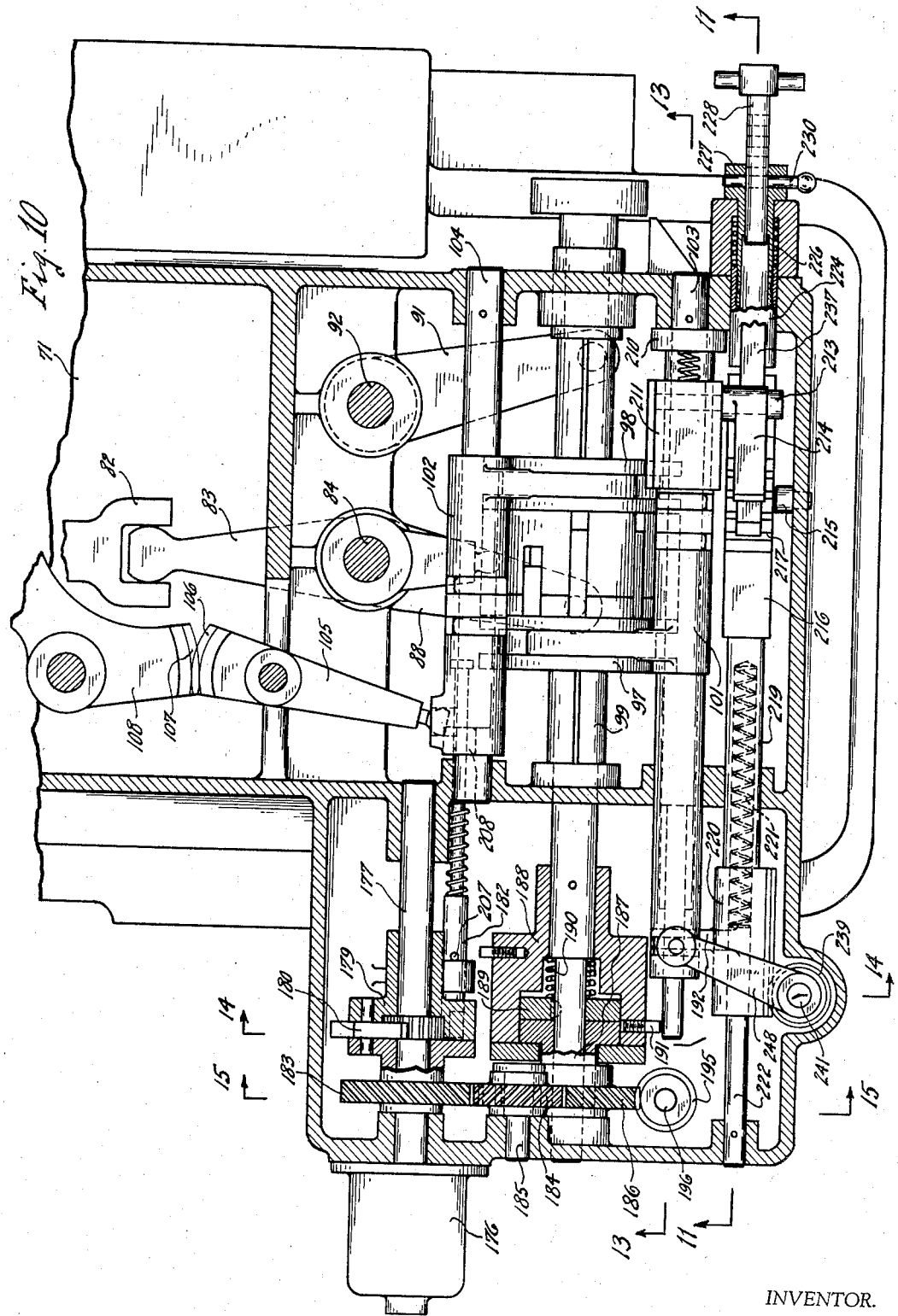

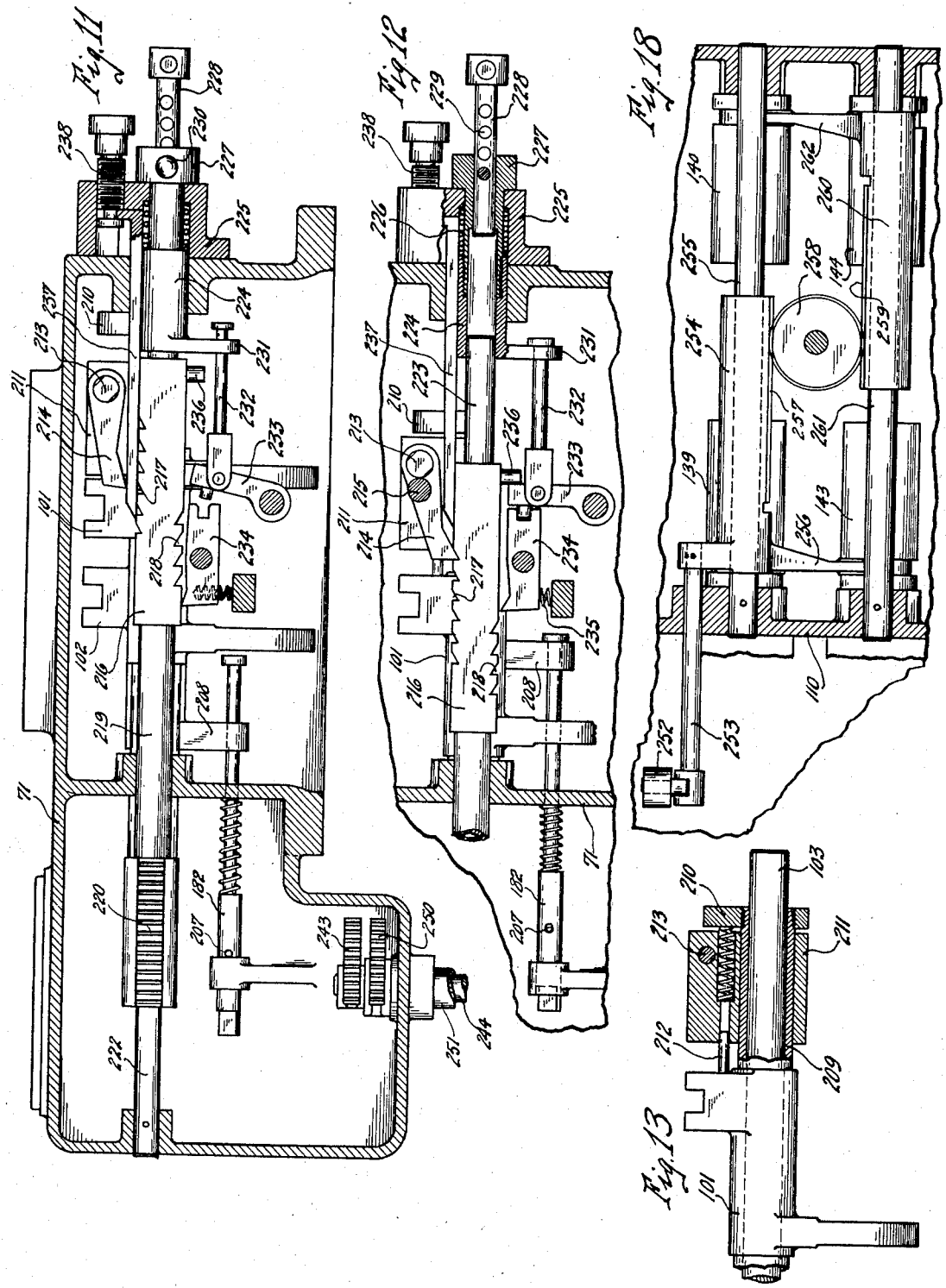

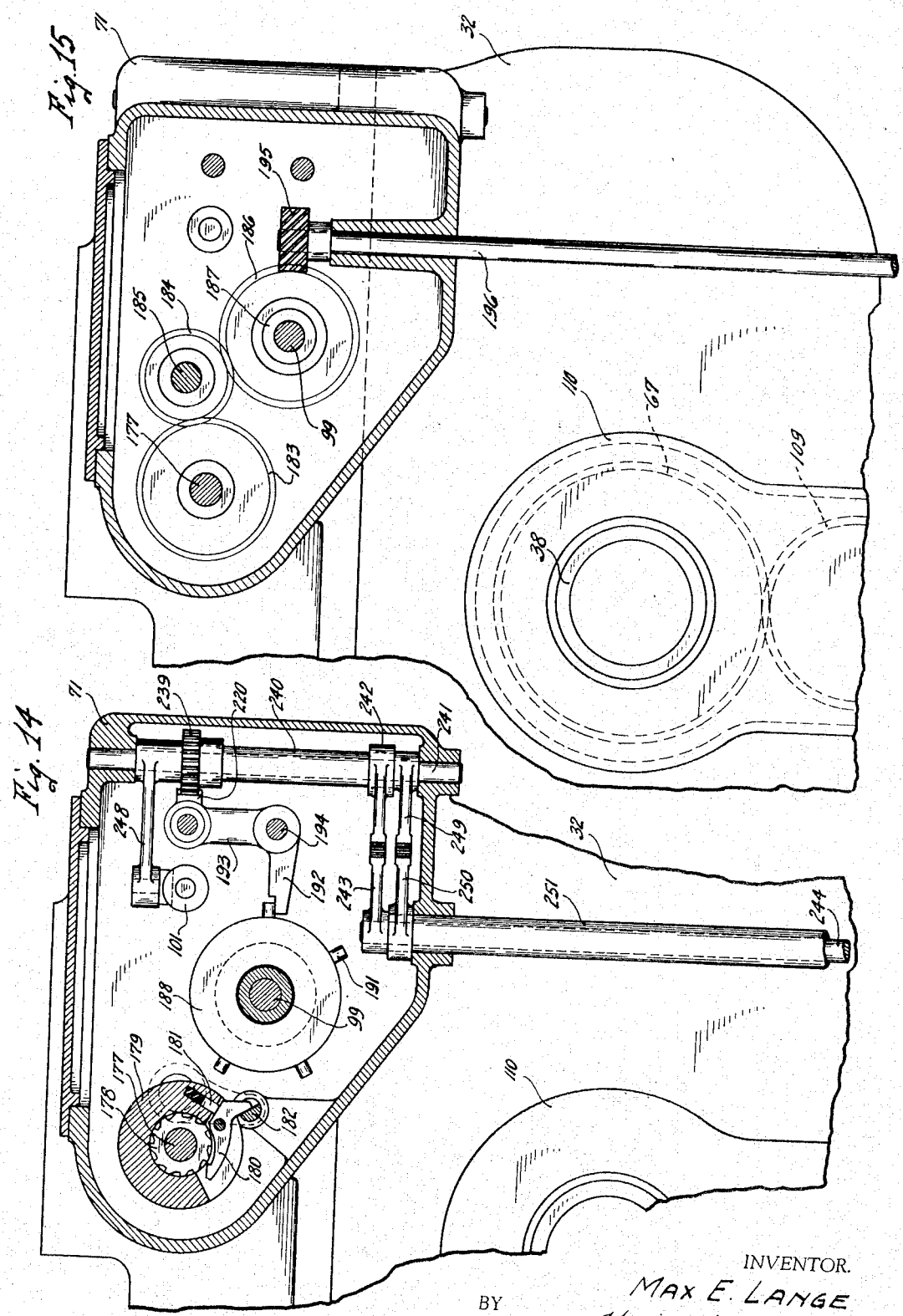

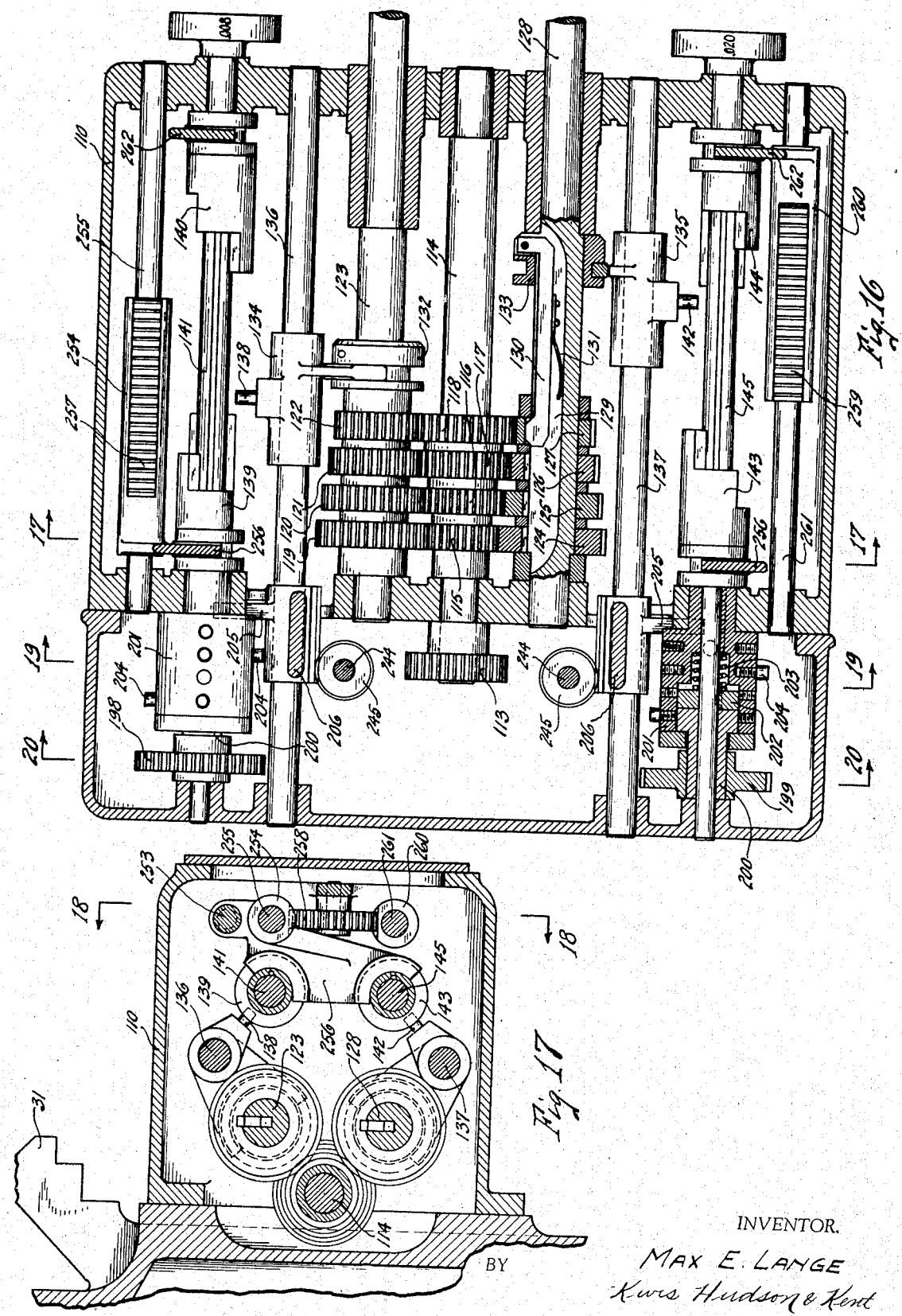

June 20, 1944.　　　　M. E. LANGE　　　　2,351,687
MACHINE TOOL
Filed April 15, 1941　　　11 Sheets-Sheet 10
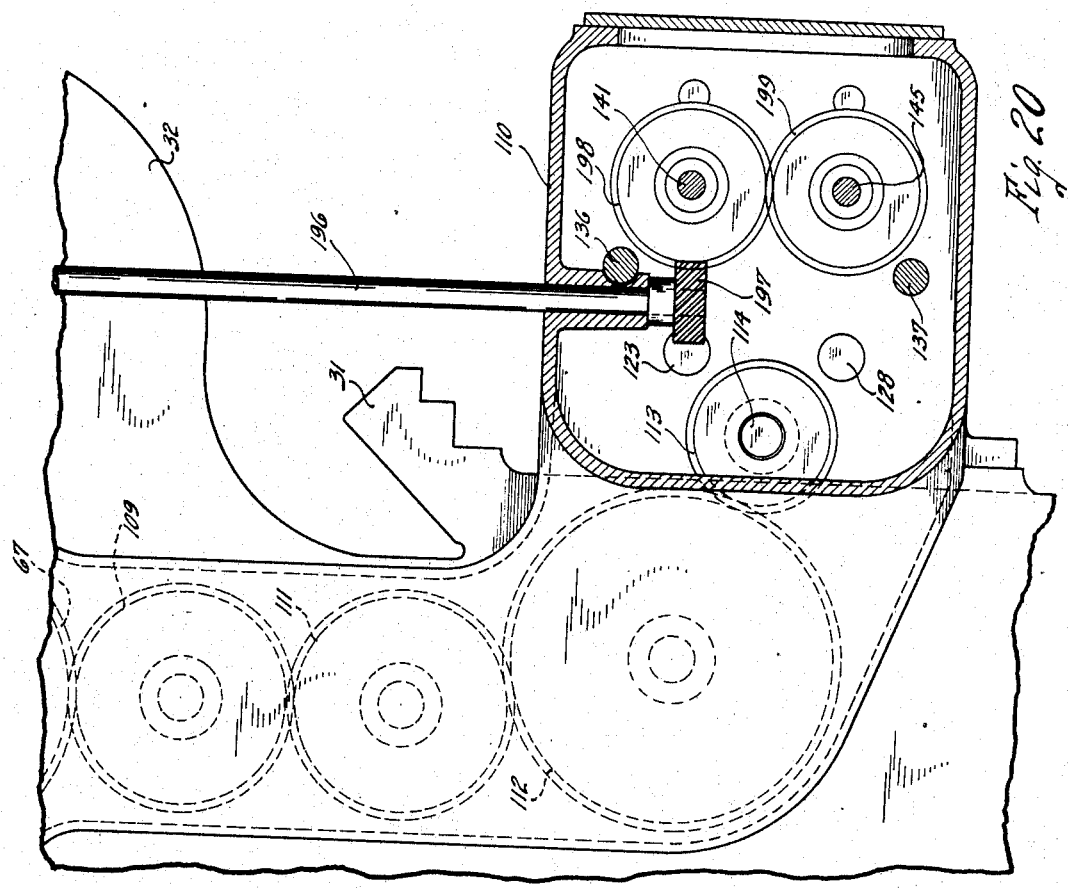
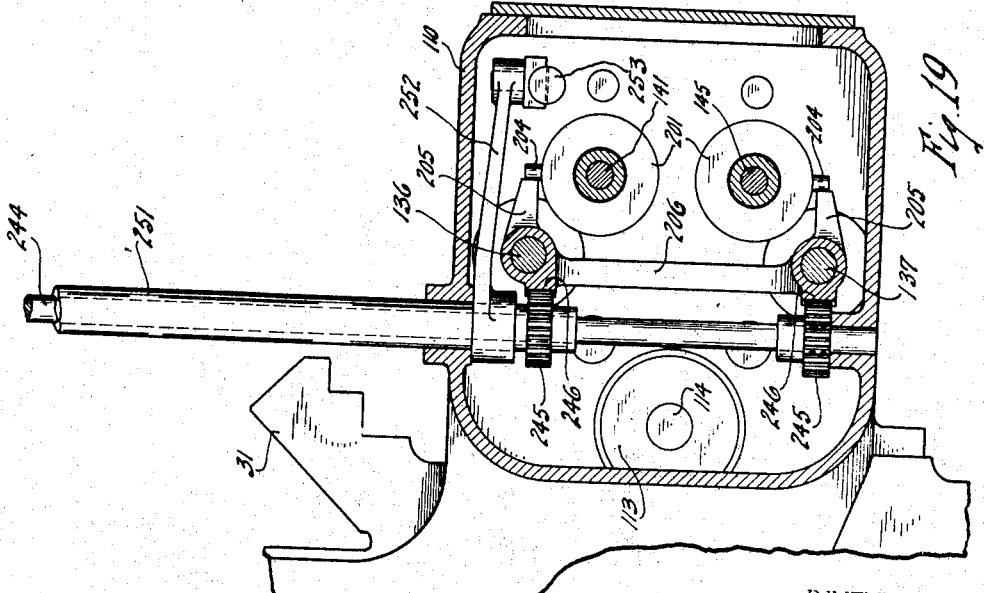
INVENTOR.
MAX E. LANGE
BY
ATTORNEY.

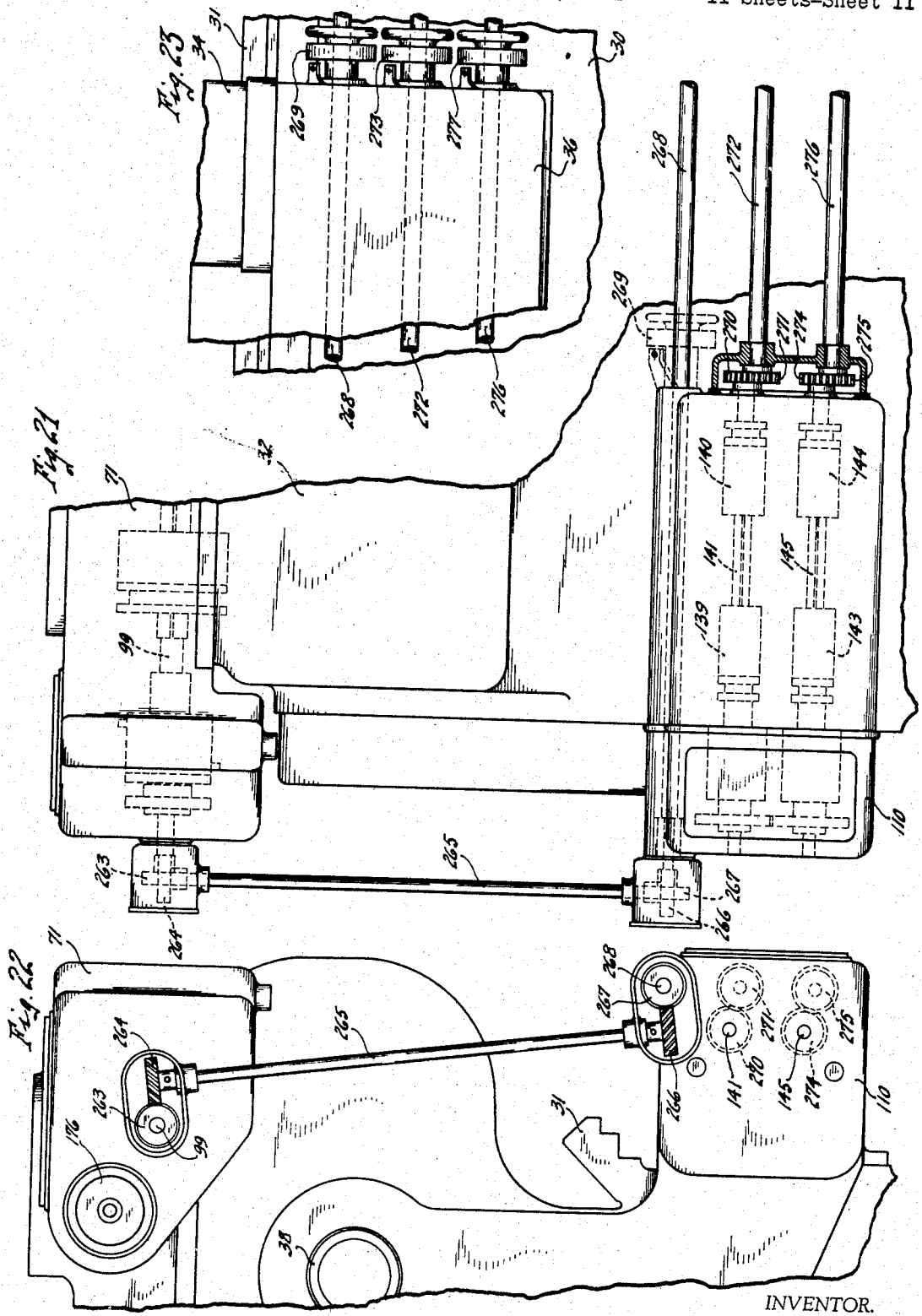

UNITED STATES PATENT OFFICE 2,351,687

MACHINE TOOL

Max E. Lange, Cleveland Heights, Ohio, assignor to The Warner & Swasey Company, Cleveland, Ohio, a corporation of Ohio Application April 15, 1941, Serial No. 388,650

22 Claims. (Cl. 29—64)

This invention relates to a machine tool and particularly to a machine tool of the type having a rotatable work or tool spindle and one or more slidable members, such as a cross slide carriage and cross slide or a turret slide.

An object of the invention is to provide in a machine tool having a plurality of movable members improved mechanism for controlling the rates of movement of said members, such that the efficiency of operation of the machine tool is substantially increased.

Another object is to provide in a machine tool having a plurality of movable members mechanisms for controlling the different rates of movement of said members and a single control lever operatively associated with said mechanisms and effecting the entire control and operation thereof.

Another object is to provide in a machine tool having a plurality of movable members mechanisms for selecting or preselecting the different rates of movement for said members and for obtaining the selected or preselected rates of movement thereof and which mechanisms are controlled and operated by a single control lever.

A further object is to provide in a machine tool having a plurality of movable members and separate means for moving said members at different rates of movement, mechanisms for selecting or preselecting and for obtaining the different rates of movement of said members such that the operator can control and operate said mechanisms from a single control or operating station or position.

Another object is to provide in a machine tool having a plurality of movable members control mechanisms for said members such that said mechanisms can be preset so that an operator can automatically select or preselect and obtain the different rates of movement for said members in the different operative steps of a work cycle merely by the movement of a single control lever.

A still further object is to provide in a machine tool having a rotatable work or tool spindle and one or more slidable members improved means for obtaining the different speeds and rates of feeding movement for said spindle and slidable members and which is controlled by a single control lever.

A still further object is to provide in a machine tool having a rotatable work or tool spindle and one or more slidable members improved means for selecting or preselecting the different speeds and rates of feeding movement for said spindle and members and for obtaining the same, and which means is controlled and operated by a single control lever.

Another object is to provide in a machine tool means whereby the operator can by the movement of a single control lever obtain the predetermined spindle speeds and rates of feeding movement for the slide or slides in the different operative steps of a complete work cycle of the machine.

Further and additional objects and advantages not hereinbefore referred to will become apparent hereinafter during the following detailed description of embodiments of the invention.

Referring to the accompanying drawings,

Fig. 3 is a transverse vertical sectional view through the headstock of the machine tool shown in Fig. 1, but on a larger scale, and is taken on line 3—3 of Fig. 6 looking in the direction of the arrows.

Fig. 4 is a fragmentary vertical sectional view through the headstock and is taken substantially on line 4—4 of Fig. 6 looking in the direction of the arrows.

Fig. 5 is a detached detail view of the element which mounts the control lever.

Fig. 6 is a top plan view of the headstock with a certain portion of the cover broken away.

Fig. 7 is a fragmentary view similar to Fig. 6 but with a different portion of the cover of the headstock broken away.

Fig. 8 is a sectional view through one or the other of the aprons of the slides and is taken substantially on irregular line 8—8 of Fig. 9 looking in the direction of the arrows.

Fig. 9 is a developed sectional view taken substantially on irregular line 9—9 of Fig. 8 looking in the direction of the arrows.

Fig. 10 is a view similar to Fig. 7 but on a larger scale, with certain parts omitted, other parts shown in different operative positions, and with certain of the parts indicated in section.

Fig. 11 is a sectional view taken substantially on line 11—11 of Fig. 10 looking in the direction of the arrows.

Fig. 12 is a view similar to Fig. 11 but showing the parts in different operative relationship.

Fig. 13 is a fragmentary sectional view taken substantially on line 13—13 of Fig. 10 looking in the direction of the arrows.

Fig. 14 is a sectional view taken substantially on line 14—14 of Fig. 10 looking in the direction of the arrows.

Fig. 15 is a sectional view taken substantially on line 15—15 of Fig. 10 looking in the direction of the arrows.

Fig. 16 is a developed view partly in elevation and partly in section of the variable speed drive for one or more of the slides, together with the mechanisms for controlling said drive.

Fig. 17 is a sectional view taken substantially on line 17—17 of Fig. 16 looking in the direction of the arrows.

Fig. 18 (sheet 7) is a sectional view taken substantially on line 18—18 of Fig. 17 looking in the direction of the arrows.

Fig. 19 is a sectional view taken substantially on line 19—19 of Fig. 16 looking in the direction of the arrows.

Fig. 20 is a sectional view taken substantially on line 20—20 of Fig. 16 looking in the direction of the arrows.

Fig. 21 is a fragmentary front elevational view of the headstock end of the machine tool showing the same equipped with means for manually indexing the spools during the setting up of the machine.

Fig. 22 is a fragmentary end elevational view taken from the left hand end of Fig. 21, and Fig. 23 is a fragmentary front elevational view of the apron of one of the slides and shows the dials for manually indexing the spools carried by said apron.

Figure 1:
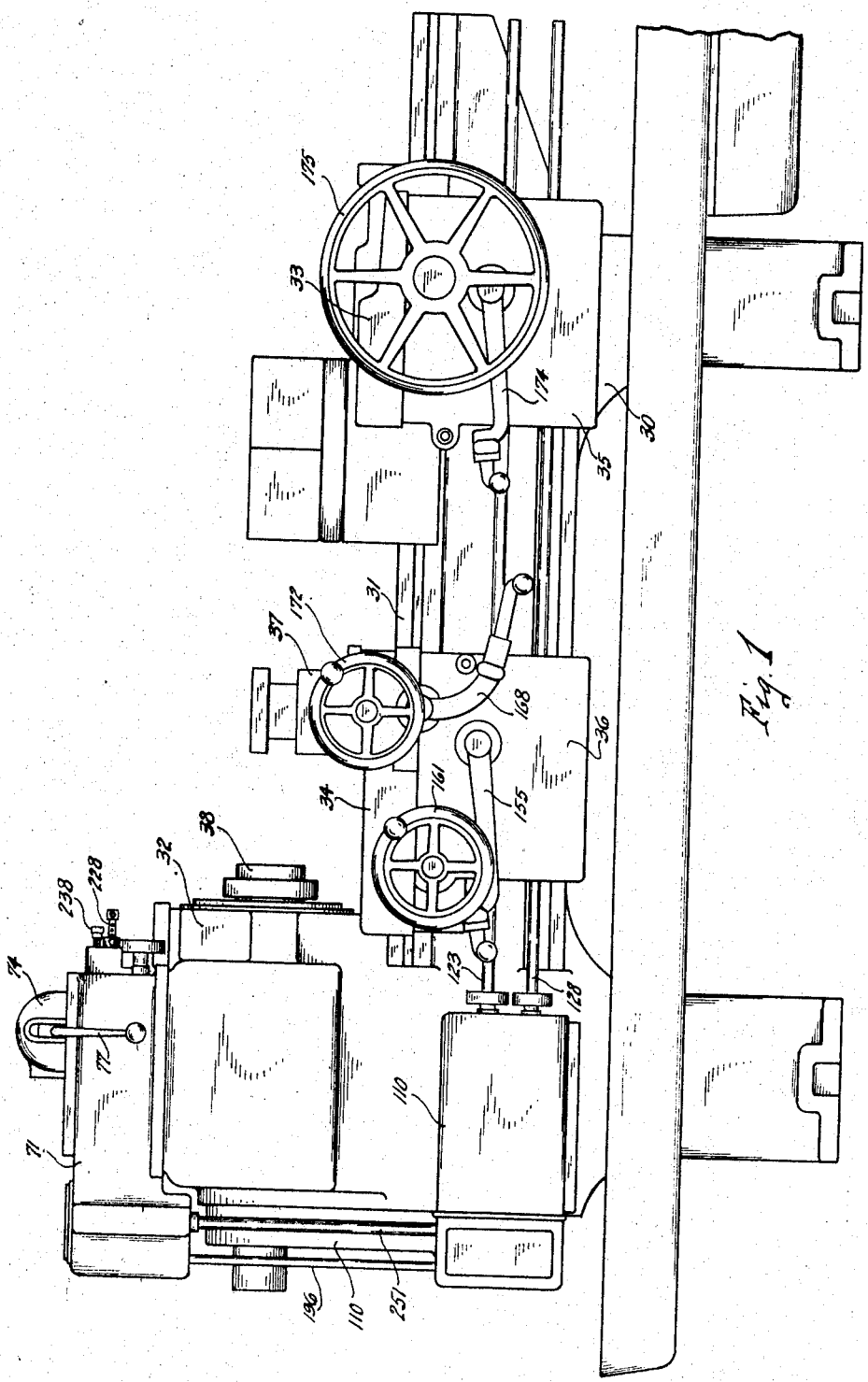
Fig. 1 is a front elevational view of a machine tool embodying the invention, with the machine tool shown in this illustration as a turret lathe.

The machine tool shown in Fig. 1 comprises a bed 30 having the usual longitudinally extending ways 31 and at one end of the ways a headstock 32. Slidably mounted on the ways 31 are a plurality of movable members such as the turret slide 33 and cross slide carriage 34, with the turret slide having an apron 35 and the cross slide carriage an apron 36. The cross slide carriage slidably supports a cross slide 37.

Figure 2:
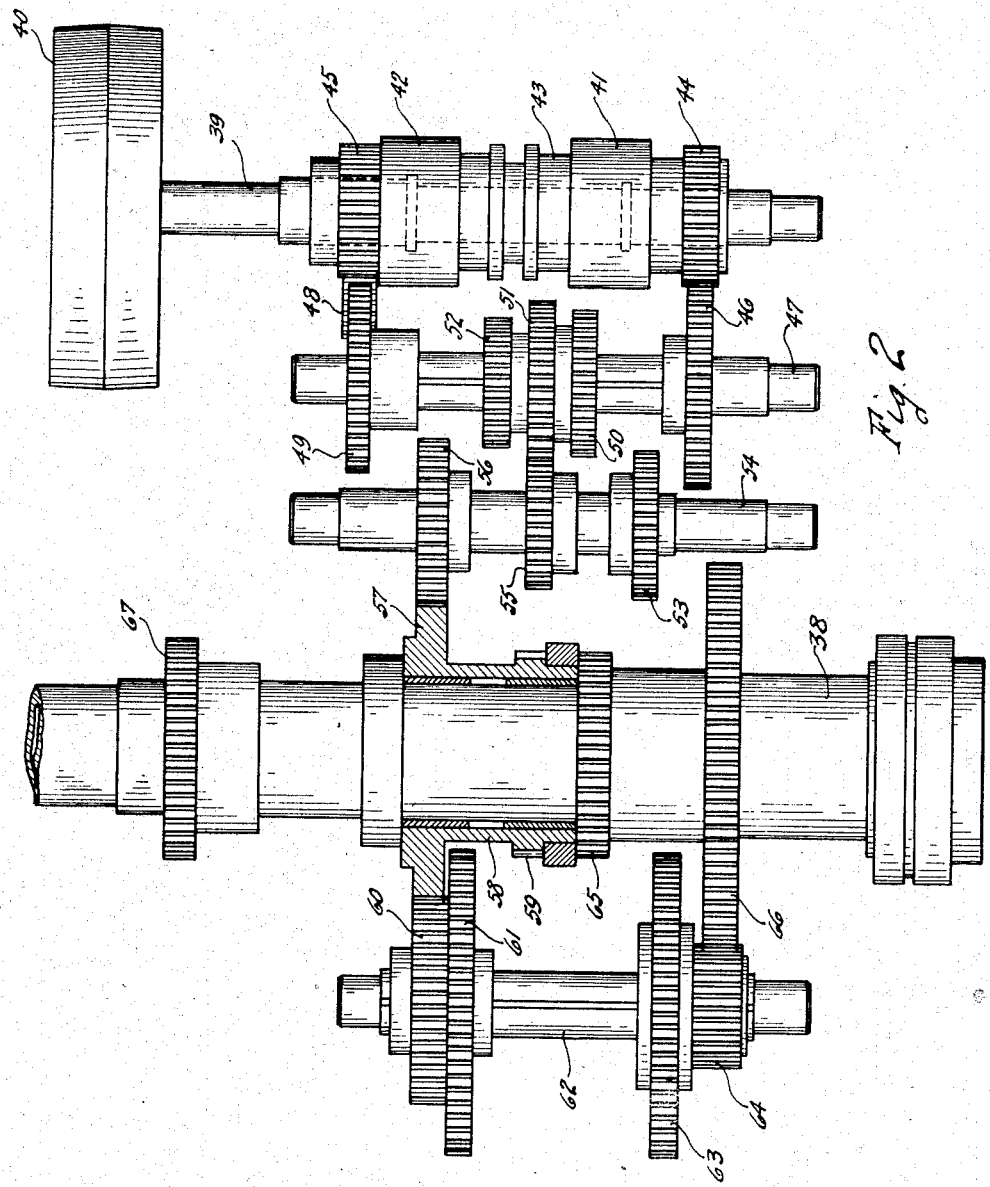
Fig. 2 is a developed view of the gearing in the headstock of the machine tool shown in Fig. 1 and which gearing constitutes the variable speed drive for the spindle.

A movable member such as the work spindle 38 is rotatably mounted in suitable bearings in the headstock 32 and is arranged with its axis parallel to the ways 31 of the bed as will be well understood. The spindle 38 can be driven at a plurality of different speeds by means of change speed gearing which will now be described and which is illustrated in the developed view, Fig. 2.

A shaft 39 is rotatably supported by the headstock and, in this instance, extends outwardly of the rear end of the headstock and has fixed thereto a pulley 40 which can be driven from a suitable power source by means of a belt. Of course the shaft 39 may be directly driven by an electric motor or other suitable power sources. The shaft 39 has freely mounted thereon two clutch elements 41 and 42, while intermediate said clutch elements is a shiftable clutch element 43 that is splined to the shaft to rotate therewith and move endwise thereon. The clutch elements 41 and 42 are provided, respectively, with gears 44 and 45 preferably formed integral with the elements.

The gear 44 of the clutch element 41 is constantly in mesh with a gear 46 fixed to a shaft 47 that is rotatably supported in the headstock. The gear 45 of the clutch element 42 is constantly in mesh with an idler gear 48 which, in turn, is constantly in mesh with a gear 49 also fixed to the shaft 47. It will be seen that the shaft 47 can be rotated in either the forward or reverse directions from the shaft 39, depending upon whether the shiftable clutch element 43 is interengaged with the element 41 or the element 42.

A three-step gear cone is splined on the shaft 47 intermediate the gears 46 and 49 and consists of the gears 50, 51 and 52. The gears 50, 51 and 52 of the three-step gear cone can, respectively, be intermeshed with gears 53, 55 and 56 fixed to a shaft 54 rotatably supported in the headstock. The gear 56 is constantly in mesh with a gear 57 formed on a sleeve 58 that is freely rotatable on the spindle 38 but is held against axial movement thereon. The sleeve 58 also has formed thereon a gear 59.

The gears 57 and 59 of the sleeve 58 can be selectively intermeshed, respectively, with gears 60 and 61 of a rear two-step gear cone that is splined on a shaft 62 rotatably mounted in the headstock. The shaft 62 also has splined thereon a front two-step gear cone formed of the gears 63 and 64, which can be selectively intermeshed, respectively, with gears 65 and 66 fixed to the spindle 38.

It will be seen that the spindle 38 can be rotated at any one of twelve different speeds in either the forward or reverse direction by means of the change speed gearing and clutch previously described.

The spindle 38 also has fixed thereto rearwardly of the sleeve 58 a gear 67 which drives the change speed gearing for imparting the different feeding movements to the slides as will later be pointed out.

The shiftable clutch element 43 is moved to either of its two operative positions or to its intermediate or clutch disengaged position by means of a yoke 68 which engages in an annular groove formed in the clutch element 43, and which yoke is formed integral with a sleeve 69 slidably supported upon a rod 70 fixedly carried by the cover 71 of the headstock. The sleeve 69 is provided with a groove into which extends the rounded end of a lever arm 72 that is fixed to the lower end of a downwardly extending portion 73 formed integral with a main control lever supporting bracket 74 (see Figs. 3 and 5). The bracket 74 is provided with a cylindrical boss portion 75 rockably mounted in an opening formed in the cover 71 of the headstock. The bracket 74 has rockably mounted therein a short shaft 76 to which is connected the main control lever 77 that extends forwardly of the cover of the headstock and then is downwardly offset at the front of the machine so as to be within convenient reach of the operator.

The shaft 76 is rockable about its own axis but is not otherwise movable in the bracket 74, wherefore when the main control lever 77 is moved in a horizontal plane the bracket 74 is rocked about the axis of the boss portion 75, and such rocking movement, in turn, through the downwardly extending portion 73 effects rocking movement of the lever arm 72 and shifting movement of the sleeve 69 and shiftable clutch element 43.

Consequently it will be seen that the main control lever 77 controls the engagement or disengagement of the forward and reverse drives to the spindle 38. The short shaft 76 has secured thereto a downwardly extending lever 78 which projects through the boss portion 75 and has its lower end of spherical formation. The purpose and function of the lever 78 will later become clear.

The three-step gear cone on the shaft 47 is shifted by means of a shoe 79 which straddles the gear 51 and is formed integral with a sleeve 80 that is slidably mounted on the shaft 81 which supports the idler gear 48. The sleeve 80 is provided with an integral and lateral extension 82 forked at its end to receive the spherical end portion of a lever arm 83 that has its opposite end fixed to the lower end of a vertically extending shaft 84 rockably supported in suitable bearings in the cover 71. A short lever arm 85 is fixed to the shaft 84 intermediate its bearings and is provided at its end with a pin 86. It will be understood that rocking movements imparted to the lever arm 85 will, through the shaft 84 and lever arm 83, transmit sliding movements to the sleeve 80 and thus effect shifting movement of the three-step gear cone.

The rear two-step gear cone on the shaft 62 and formed of the gears 60 and 61 is shifted to either one of its two operative positions by means of a shoe 87 pivotally carried by the free end of a lever arm 88 and having a pin 89 projecting upwardly above said lever arm. The opposite end of the lever arm 88 is freely rockable on the shaft 84 intermediate the lever arm 83 and the lower bearing for said shaft.

The front two-step gear cone on the shaft 62 formed of the gears 63 and 64 is shifted to either one of its two operative positions by means of a shoe 90 that is pivotally carried at the free end of a lever arm 91 which has its opposite ends fixedly secured to the lower end of a vertically extending shaft 92 rockably supported in suitable bearings in the cover 71 (see Fig. 4). A sleeve-like portion of a lever arm 93 is fixed to the shaft 92 intermediate the bearings for said shaft and has its free end pivotally connected to one end of a link 94. The opposite end of the link 94 is pivotally connected to one end of a bent lever 95, the opposite end of which is freely rockable on the shaft 84 intermediate the lever arm 85 and the upper bearing for said shaft. The pin 96 which forms the pivotal connection between the link 94 and the bent lever 95 extends below the underside of the lever 95.

It will be seen that when the pin 89 is moved and the lever arm 88 is rocked on the shaft 84 the rear two-step gear cone will be shifted. Also it will be noted that movement of the pin 96 pivotally connecting the bent lever 95 and the link 94 will result in rocking movement being imparted to the lever arm 93 and through the shaft 92 to the lever arm 91 and shoe 90, thus effecting shifting of the front two-step gear cone.

The pins 86, 89 and 96 are arranged between the adjacent faces of a pair of spools 97 and 98. These spools have on their adjacent faces cooperating series of long and short projections, short and long projections and projections of equal length, and it is these projections which engage with the pins and cause movement of the latter to effect shifting of the gear cones as will be well understood.

The spools 97 and 98 are splined upon a rotatable shaft 99 suitably supported in the cover plate 71, whereby when said shaft is rocked or rotated said spools will be indexed. The spools 97 and 98 can be moved linearly of the shaft 99 away from each other to an indexing position wherein the projections on the adjacent faces of the spools are free of the pins 86, 89 and 96 (see Fig. 7), or they can be moved linearly on the shaft 99 toward each other to bring the cooperating projections into engagement with one or more of said pins to move the same to effect the shifting of one or more of the shiftable gear cones (see Fig. 10).

The spools 97 and 98 are moved linearly toward and away from each other with an equalized movement by means of an equalizer bar 100, which is rockably supported intermediate its ends on the underside of the cover 71 (see Fig. 3) and carries at its opposite ends pivoted shoes located in transverse grooves formed in sleeves 101 and 102 that are slidably supported on stationary rods 103 and 104 also carried by the headstock cover 71.

The sleeves 101 and 102 are provided with integral yokes which extend into annular grooves formed in the spools 97 and 98. The sleeve 102 is provided adjacent one end with a spherical recess into which extends a spherical knob carried by a lever arm 105 that is pivotally mounted intermediate its ends on a bearing pin carried by the cover 71 (see Figs. 7 and 10). The other end of the lever arm 105 is provided with a segmental gear portion 106 that meshes with a corresponding segmental gear portion 107 formed on the end of an angular lever 108 that is pivotally supported intermediate its ends on a bearing pin carried by the cover 71 and has its opposite end provided with a slot which carries a flanged bushing that receives the spherical lower end of the lever 78 (see Figs. 3 and 6).

It will thus be seen that when the main control lever 77 is rocked in a vertical plane from the full line position of Fig. 3 to the dash line position thereof, the lever arms 108 and 105 will be rocked and the sleeves 101 and 102 moved with an equalized movement because of the equalizer bar 100, to cause linear movement of the spools 97 and 98 from their most inward position, as shown in Fig. 10, to their most outward or indexing position as shown in Fig. 7.

It will also be understood that movement of the main control lever 77 from its dash line position B of Fig. 3 to its full line position effects an equalized movement of the spools 97 and 98 in the same way from their most outward or indexing position inwardly to bring the cooperating projections into engagement with the pins 86, 89 and 96 to effect shifting of the gear cones.

The feed drives for the cross slide carriage, the cross slide and the turret slide will now be explained. As previously stated the spindle 38 has fixed thereto a gear 67 and this gear 67 constantly meshes with a gear 109 that is rotatably supported in the two-part gear box 110 carried by the end and front lower side of the headstock 32. Also mounted in the gear box 110 and rotatably supported thereby are the constantly intermeshed gears 111 and 112, with the gear 111 constantly intermeshing with the gear 109. The gear 112 constantly meshes with a gear 113 fixed to a countershaft 114 that is rotatably mounted in that part of the gear box 110 which is at the lower front side of the headstock, see Figs. 16 and 20. The gearing just described constitutes a feed drive train between the spindle and the shaft 114 which is operatively connected to the feed shaft. The shaft 114, in this instance, has fixed thereto a four-step gear cone formed of the gears 115, 116, 117 and 118. The gears 115, 116, 117 and 118 constantly mesh, respectively, with gears 119, 120, 121 and 122 freely rotatable on the feed shaft 123 and also with gears 124, 125, 126 and 127 which are freely rotatable on the feed shaft 128. The feed shafts 123 and 128 are provided with similar elongated slots 129 in which are movably mounted shiftable keys 130 which are urged by springs 131 radially outwardly of the shafts and of the slots so as to position the beveled end portion of the keys into keyways formed in the gears previously referred to and which ordinarily are freely rotatable on the shafts 123 and 128. Inasmuch as the arrangement of the sliding keys 130 is the same for both shafts 123 and 128 only the latter shaft has been shown in section in Fig. 16. It will be understood that when the keys 130 are shifted linearly of the shafts 123 or 128 one or the other of the gears 119, 120, 121 and 122 can be selectively connected to the shaft 123 or one or the other of the gears 124, 125, 126 and 127 can be selectively operatively connected to the shaft 128 to rotate therewith, as is well understood in the art. Consequently it will be seen that in the illustrated instance the feed shafts 123 and 128 can be driven from the shaft 114 at any one of four different speeds.

The keys 130 are hingedly connected to collars 132 and 133, slidably supported on the shafts 123 and 128 respectively. These collars are provided with annular grooves which are embraced by integral yoke portions formed on the sliding sleeves 134 and 135. The sleeve 134 is slidably supported on a stationary rod 136 carried by the front part of the gear box 110, while the sleeve 135 is slidably supported on a stationary rod 137 also carried by the front part of the gear box.

The sleeve 134 is provided with a radially disposed pin 138 which lies intermediate the adjacent faces of a pair of spools 139 and 140 which carry on their adjacent faces cooperating pairs of long and short projections and short and long projections. The spools 139 and 140 are splined on a shaft 141 which is rotatably supported in suitable bearings formed in the gear box 110.

Similarly, the sleeve 135 is provided with a radially extending pin 142 that lies intermediate the adjacent end faces of a pair of spools 143 and 144 and which spools are also provided on their adjacent end faces with cooperating pairs of long and short projections and short and long projections. The spools 143 and 144 are splined on a shaft 145, which likewise is rotatably mounted in suitable bearings formed in the gear box 110.

The feed shaft 123 extends outwardly of the gear box 110 and along the front face of the bed of the machine and through the apron 36 of the cross slide carriage and has a splined driving connection to the feed train carried by the apron. The feed shaft 128 also extends outwardly of the gear box 110 and along the front face of the bed of the machine and through the apron 36 of the cross slide carriage and the apron 35 of the turret slide and has within this latter apron a splined driving connection to the feed train carried by the apron as will later be explained, see Figs. 8 and 9.

The shaft 123 within the apron 36 has a splined connection with a gear 146 which is rotatably supported in the apron and held against axial movement, as is well known in the art. The gear 146 constantly meshes with a gear 147 that is fixed to a shaft 148 rotatably supported by the apron and, as viewed in Fig. 8, located equidistant from shafts 123 and 128, for a purpose later to become apparent. The shaft 148 has a worm 149 thereon which meshes with a worm wheel 150 fixed to a shaft 151. The worm wheel 150 is integrally connected on its right side face with a gear 152 for a purpose later to be described. The opposite face of the worm wheel is provided with a recess, the bottom of which has formed therein clutch teeth. A sleeve is rotatably mounted on the shaft 151 and is provided on its right hand end with a clutch member 153 extending into the recess in the worm wheel 150 and provided with similar clutch teeth; suitable spring-pressed plungers carried by the worm wheel normally maintaining the said clutch teeth disengaged, as will be well understood.

The sleeve extends beyond the front face of the apron and suitable camming means, indicated generally at 154, is actuated by the control lever 155 to move the sleeve against the action of the spring plungers to engage the clutch teeth and cause the sleeve to rotate with the worm wheel, as is well known in the art. A pinion 156 is fixed to the sleeve and meshes with the gear 157 fixed to a shaft 158 that extends parallel to the shaft 151 and projects beyond the rear of the apron and carries at its rear end a pinion 159 that meshes with the rack 160 carried by the cross slide carriage fixed to the bed as is well known in the art.

It will be seen that when the sleeve with the pinion 156 is clutched and rotated by the worm wheel 150 the pinion 159 will travel along the rack 160 and cause the cross slide carriage to move longitudinally of the bed. The cross slide carriage may be moved longitudinally of the bed manually by means of a hand wheel 161 fixed to a shaft that carries a pinion 162 which meshes with the gear 157.

The gear 152 meshes with a gear 163 fixed to a shaft 164 rotatably mounted in the apron. The gear 163 on its left hand face is provided with a clutch portion 165 having clutch teeth similar to the clutch teeth on the worm wheel 150 and which can be intermeshed with corresponding clutch teeth formed on the end of the clutch portion 166 at the right hand end of a sleeve which is rotatably mounted on the shaft 164, as is well known in the art. Suitable spring-pressed plungers (not shown) normally maintain the clutch teeth of the clutch portions 165 and 166 disengaged, as will be understood.

The sleeve which carries the clutch portion 166 extends beyond the front of the apron and is provided with suitable camming means, indicated generally at 167, and which means is operated by the control lever 168 as is well known in the art. The sleeve, in addition to the clutch portion 166, also is provided with a gear 169 which meshes with a pinion 170 having a splined connection with the cross slide-feed screw 171, as is well known in the art.

It will be seen that when the clutch teeth of the clutch portions 165 and 166 are engaged under the action of the control lever 168 the pinion 170 and the feed screw 171 will be rotated to impart feeding movement to the cross slide. The screw 171 extends beyond the front of the cross slide and a hand wheel 172 is fixed thereto to provide for manual movement of the cross slide.

The feed shaft 128 which extends into the apron 35 of the turret slide is operatively connected to the turret slide by a feed train mounted in the apron 35 and identical with the feed train in the apron 36 which operatively connects the feed shaft 123 with the cross slide carriage. Inasmuch as the feed train between the shaft 128 and the turret slide is well known and is identical with the feed train for the cross slide carriage it is not believed to be necessary to specifically illustrate the same herein. However, the feed shaft 128 is shown in Fig. 8 and there is also indicated on said shaft by dash lines a gear 173 which is identical with the gear 146 and is carried similarly by the apron 35 and meshes with the gear of the turret slide feed train that corresponds to the gear 147, it being recalled that the center distance between shafts 123 and 148 is the same as the center distance between shafts 128 and 148.

It will be understood that the control lever 174 for the turret slide operates a clutch in the feed train of the turret slide similar to the control lever 155 for the cross slide carriage.

It will also be understood that the hand wheel 175 is fixed to an extended end of a shaft of the turret slide feed train for operating the turret slide manually.

The mechanism for indexing the spools in the headstock to select or preselect different spindle speeds and the spools in the gear box to select or preselect different feeds for the carriage and cross slide and for the turret slide will now be explained.

The headstock supports at one end thereof a constantly operated motor 176 which drives a shaft 177 rotatably supported in suitably spaced bearings. The shaft 177 has fixed thereto a ratchet 178 which extends into a recess formed in a sleeve 179 rotatably mounted on the shaft 177, see Figs. 10 and 14. The sleeve 179 is illustrated as formed of two portions which are bolted or otherwise secured together and said sleeve at the junction of the two portions thereof pivotally supports a pawl 180 which cooperates with the ratchet 178. The pawl 180 is constantly urged in a ratchet engaging direction by a spring-pressed plunger 181. The pawl also has an extending heel portion which is engaged by a shiftable spring pressed rod 182 to move and hold the pawl in ratchet disengaged position. The rod 182 is actuated to release the pawl in a manner later to be described, it merely being noted, however, that the rod functions to cause the pawl and ratchet to act as a one rotation clutch.

The two-part sleeve 179 carries a gear 183 which meshes with an idler gear 184 carried on a suitable stub shaft 185, which idler gear meshes with a gear 186 carried by a sleeve 187 that is freely rotatable on the shaft 99 and has at its right hand end an enlarged portion forming part of a friction clutch mechanism, see Figs. 10 and 15. A housing 188 is fixed to the shaft 99 and has a counterbored portion within which the enlarged right hand end portion of the sleeve 187 is located. Also in the counterbored portion of the housing 188 is a disk 189 splined to the shaft 99 and constantly urged into frictional engagement with the enlarged portion of the sleeve 187 by a spring 190.

The housing 188 is provided on its periphery with a plurality of circumferentially spaced openings arranged in circular groups corresponding in number to the number of operative steps in a complete work cycle and spaced longitudinally of the housing. The number of such openings in each circular group corresponds with the number of different indexed positions for the spools 97 and 98 which, in this instance, would be twelve, corresponding to the twelve different spindle speeds.

A stop pin 191 is mounted in an opening of each circular group of openings in accordance with the desired spindle speed for each operative step in the work cycle. These stop pins successively contact a step by step shiftable stop arm 192, which arm, in this instance, is integrally formed with a member 193 that is slidable on a rod 194 with a step by step shiftable movement, see Figs. 10 and 14.

It will be understood that when a stop pin 191 contacts the arm 192 rotation of the housing 188 and spool shaft 99 will terminate, at which time the enlarged end of the sleeve 187 will slip relative to the disk 189 until the disk has completed a revolution, it being observed that the gear 183 on the shaft 177 is of the same size as the gear 186 on the sleeve 187. The mechanism for imparting the step by step shiftable movement to the member 193 will be described hereinafter.

The gears 183, 184 and 186 are spiral gears and the latter gear 186 meshes with a spiral pinion 195 fixed to the upper end of a vertically extending shaft 196 that extends downwardly into the gear box 110, see Figs. 10, 15 and 20, and has fixed to its lower end a similar spiral pinion 197. The pinion 197 meshes with a spiral gear 198 which latter gear meshes with a similar spiral gear 199. The gears 198 and 199 are fixed to similar sleeves 200, freely rotatable respectively on the spool shafts 141 and 145. Only one of said sleeves is shown in section in Fig. 16, inasmuch as the sleeves are identical in construction. These sleeves form part of frictional driving connections between the gears 198 and 199 and the shafts 141 and 145, respectively, but inasmuch as these driving connections are identical only one need be described herein.

The sleeves 200 that are freely rotatable on the shafts 141 and 145 are provided at their right hand ends with enlarged portions located in counterbores formed in housings 201, as clearly indicated in section in Fig. 16. The housings 201 are keyed to the shafts 141 and 145, respectively and have associated therewith within said counterbores disks 202 splined to the shafts and constantly urged by springs 203 into frictional contact with the enlarged ends of the sleeves 200. The housings 201 are provided on their peripheries with a plurality of circumferentially spaced openings arranged in circular groups spaced longitudinally of the housings. Stop pins 204 are selectively mounted in these openings, with one stop pin arranged in an opening of each group. The circumferentially spaced openings in each group correspond in number to the different indexed positions of the spools 139 and 140 or 143 and 144 as the case may be, which indexed positions are correlated to the different number of feeding rates which can be imparted to the cross slide carriage and cross slide or to the turret slide. The stop pins 204 mounted in each housing correspond in number to the number of operative steps in the work cycle. The stop pins 204 will successively contact with stop arms 205 projecting from a member 206 slidably mounted on the rods 136 or 137 to have a step by step movement thereon, see Figs. 16 and 19. The mechanism for imparting the step by step movements to the member 206 and the arms 205 projecting therefrom will be described hereinafter.

The rod 182 is momentarily moved out of contact with the heel of the pawl 180 to initiate the one rotation of the sleeve 179 and gear 183 in the manner now to be explained.

As shown in Fig. 10, the rod 182 has a reduced extension toward the right which carries a spring normally urging the rod toward the left and into heel engaging position, which position is determined by a pin 207 carried by the rod 182 abutting a bearing lug that supports the rod. The reduced extension on the rod 182 passes through an opening in an arm 208 projecting downwardly from the sleeve 102 and said extension has at its extreme end a shoulder.

When the main control lever 77 is in the full line position shown in Fig. 3 the spools 97 and 98 are in their most inward position as shown in Fig. 10. The movement of the main control lever 77 from the full line position of Fig. 3 to dash line position A moves the spools away from each other until the projections on their adjacent faces are free of the pins 86, 89 and 96, see Fig. 7. At this time the shoulder on the end of the reduced extension of the rod 182 contacts the arm 208, wherefore the operator by momentarily moving the main control lever from position A upwardly to dash line position B of Fig. 3 causes further movement of the sleeve 102 toward the right and a further separation of the spools and this further movement results in moving the rod 182 against the action of the spring mounted thereon until the rod is free of the heel of the pawl 180, whereupon the pawl immediately engages the ratchet 178 and the sleeve 179 rotates with the shaft 177.

As already stated, the movement of the control lever to position B is momentary and upon the operator releasing said control lever the spring on the rod 182 will move said rod toward the left until the pin 207 engages the bearing lug and the rod 182 is in position to contact the heel of the pawl 180 when the sleeve 179 has made a complete revolution. This movement of the rod 182 toward the left under the action of the spring shifts the sleeve 102 toward the left as viewed in Fig. 10 and moves the main control lever from dash line position B to dash line position A of Fig. 3, at which time the spools are still separated and in indexing position.

The sleeve 101 has at its right hand end a reduced extension 209 which is threaded at its outer end and mounts a fixed shoulder washer 210, see Figs. 10 and 13. The reduced portion 209 of the sleeve 101 intermediate the washer 210 and the sleeve carries a freely slidable block 211. The block 211 is provided with a counterbore in which is mounted a spring acting against the block and the fixed washer 210 and continuously urging the block toward the sleeve 101. The block 211 is kept from turning movement on the reduced extension 209 by a pin 212 carried by the sleeve 101 and extending into a bore formed in the block. The block 211 also carries a bearing pin 213 on which is pivotally mounted a pawl 214.

When the sleeve 101 moves from the position shown in Fig. 10 toward the left, i. e., when the control lever moves from full line position of Fig. 3 to dash line position A the block 211 and the pawl 214 move with the sleeve until the head of the bearing pin 213 strikes a fixed stop pin 215 carried by the headstock to arrest the movement of the block after which further movement of the sleeve 101 toward the left during the movement of the control lever from position A to position B of Fig. 3 moves the sleeve and the shoulder washer 210 against the action of the spring and into the position shown in Fig. 13. As soon as the operator releases the upward pressure on the main control lever while in position B the spring on the rod 182, previously referred to, and the spring acting against the block 211 restores the main control lever to position A and restores the block 211 to its former relative position on the right hand end of the sleeve 101 as shown in Fig. 10.

At the side of the sleeve 101 and in the same horizontal plane and parallel to the rod 103 is a ratchet bar 216 provided on its upper surface with ratchet teeth 217 and on its lower surface with ratchet teeth 218, see Figs. 10, 11 and 12.

The ratchet bar 216 at its left hand end as viewed in the drawings has a reduced extension 219 which is slidably supported in a bearing boss formed on the underside of the cover of the headstock. The reduced extension 219 has fixed thereto a rack portion 220 which latter portion has fixed thereto the downwardly projecting member 193, see Fig. 14, previously referred to and from which member the arm 192 extends. The reduced portion 219 and the rack portion 220 are provided with an elongated bore in which is housed a spring 221 while a fixed supporting pin 222 carried by the cover of the headstock projects into the left hand part of the bore of the rack portion 220 and constitutes an abutment for the spring 221.

The ratchet bar 216 at its right hand end, as viewed in the drawings, is provided with a reduced portion 223 which extends into the bore of a sleeve 224 which, for the purpose of assembly, is made in two parts that can be screwed together as shown in Fig. 12. The two part sleeve 224 is slidably supported in the headstock and in the bore of a bracket 225 secured to the headstock, it being noted that a spring 226 is interposed between an internal shoulder of the bracket and a shoulder on the sleeve and acts to urge the sleeve toward the left and maintains the shoulder or head 227 of the sleeve in engagement with the outer surface of the bracket.

The adjustable stop pin 228 is carried by the two-part sleeve 224 and extends through the shoulder or head 227 into the bore in the sleeve. The pin 228 is provided with a plurality of transverse openings 229 extending therethrough with the number of such openings dependent upon the number of operative steps in the work cycle. A lock pin 230 can be inserted through any one of the openings 229 and through a transverse opening formed in the shoulder or head 227 to hold the pin in relative adjusted position with respect to the sleeve 224 (see Figs. 10 and 11). The manner in which this pin functions will be described hereinafter.

The inner portion of the two-part sleeve 224 is provided with a downwardly projecting ear 231 which has an opening therethrough to slidably receive a headed pawl actuating pin 232. The head on the pin 232 is at the right hand end thereof, as viewed in Figs. 11 and 12, while the left hand end of the pin has a forked operative connection with a pivoted latch lever 233. The latch lever 233 is provided with a latch pin that cooperates with a camming recess formed in the end of a pivoted retaining pawl 234 to hold said pawl in retracted position and out of engagement with the teeth 218 on the underside of the ratchet bar 216. This pawl is normally urged into tooth engaging position by a spring 235. The ratchet bar 216 is provided on its underside and adjacent its right hand end with a downwardly extending pin 236 which, when the ratchet bar has completed its step by step movement toward the left is brought into contact with the latch 233 when the latter is in the position shown in Fig. 11. A slightly further movement of the ratchet bar 216 toward the left causes the pin 236 to move the latch lever 233 from the position shown in Fig. 11 to that shown in Fig. 12, with the result that the retaining pawl 234 is cammed or moved to an inactive position and held in such position by the latch pin on the latch lever 233.

A wedge bar 237 is slidably mounted intermediate the two-part sleeve 224 and the support for the sleeve and extends toward the left and overlies the upper surface of the rack bar 216, as indicated in Figs. 11 and 12. The wedge bar 237 at its right hand end is provided with an upwardly extending slotted heel which is accommodated in a cutaway part of the bracket 225 and which has an operative connection as shown with an adjusting screw 238.

It will be seen that when the wedge bar 237 is in the position shown in Fig. 11 with the heel contacting the bracket 225 movement of the pawl 214 toward the left will cause said pawl to ride off the wedge bar and into engagement with the left hand tooth 217 of the ratchet bar 216, so that further movement of the pawl toward the left will impart a left hand shifting movement to the ratchet bar a distance equal to one tooth and determined by the head of the bearing pin 213 contacting the stop pin 215. As will be later explained, this action of the pawl 214 is repeated for each operative step in the work cycle to impart a step by step shifting movement to the ratchet bar.

If it should be desired to render the ratchet bar inactive then the adjusting screw 238 can be screwed inwardly until its inner end contacts the headstock, at which time the wedge bar 237 will be so positioned as to overlie all of the teeth 217 of the ratchet bar 216 and thus render the pawl 214 inactive.

The step by step shifting movement imparted to the ratchet bar 216 by the pawl 214 first shifts the rack portion 220 and the arm 192 to position the latter successively in operative relationship with the different stop pins 191 carried by the housing 188 in the mechanism for indexing the spools 97 and 98, which select or preselect the spindle speeds. A further shifting movement of one step is imparted to the ratchet bar to position the parts so that the ratchet bar may be restored to its initial position at which time the stop arm 192 lies to the right of the right hand group of circular openings in the housing 188.

The rack portion 220 is intermeshed with a gear 239 fixed to a sleeve 240 that is rotatable on a vertically extending rotatable shaft 241. The sleeve 240 has fixed thereto a gear segment 242 which is in mesh with a similar gear segment 243 fixed to the upper end of a vertically extending rotatable shaft 244 that passes downwardly into the gear box 110, see Figs. 14 and 19. The shaft 244 has fixed thereto identical pinions 245 spaced apart on the shaft and meshing with rack tooth portions 246 of the integral bracket 206 that is slidably mounted on the rods 136 and 137 and has the vertically spaced stop arms 205 which cooperate with the stop pins 204 of the indexible housings 201 of the mechanisms for indexing the spools 139 and 140 and the spools 143 and 144. Although the bracket 206 is an integral member, it has been shown in Fig. 16 in two portions, since said figure is a developed view. It will be noted also that the arms 205 are shown in Fig. 16 in their initial inactive position. It will be understood that the step by step movement of the rack portion 220 also imparts a step by step movement of the bracket 206 with its arms 205 through the operative connections just above described.

It will thus be seen that when the ratchet bar 216 is given a step by step movement, as previously described, the bracket 206 will have a similar step by step movement through the operative connections which have been referred to and such step by step movement of the bracket 206 will position the arms 205 successively to cooperate with the different stop pins 204 of the indexible housings 201 to effect predetermined indexing movements of the spools 139 and 140 and the spools 143 and 144. After these spools have been indexed for the final operative step in the work cycle the arms are shifted a further step preparatory to being returned to their initial position.

It will be understood that the ratchet bar 216 is moved toward the left with its step by step movement in accordance with the number of operative steps in the work cycle, that is, if there are four operative steps in the complete work cycle the ratchet bar 216 first will be given four increments of movement and then it will be given a fifth increment of movement preliminary to being restored to its initial position.

It will also be understood that when the ratchet bar 216 is moved toward the left as if to start the fifth increment of movement the pivoted retaining pawl 234 is cammed to inoperative position and held in such position by the latch lever 233 which has been rocked by its engagement with the pin 236. Thereupon the spring 221 tends to move the ratchet bar toward the right but this movement is resisted by the pawl 214. As soon as the operator moves the main control lever 77 from dash line position A to the full line position of Fig. 3 the pawl 214 which is operatively connected with the control lever, as has been previously described, is moved toward the right until it rides up on the wedge bar 237 and is disengaged from the ratchet teeth 217. Then the spring 221 moves the ratchet bar 216 toward the right until the reduced portion 223 strikes the stop pin 228, after which the ratchet bar continues its movement toward the right for a short distance under the action of the spring 221 and against the resistance of the spring 226, during which movement the ear 223 which is now engaged with the head on the end of the pawl actuating pin 232 moves said pin and rocks the latch lever 233 to release the pivoted retaining pawl 234, whereupon said pawl engages with the under side of the ratchet bar 216 as shown in Fig. 11 and the parts are restored to their original inactive position.

It will be recalled that the restoration of the ratchet bar 216 to its original position will occur after the desired number of step by step movements have been imparted thereto and this is brought about by selectively positioning the lock pin 230 in the various openings 229 of the stop pin 228 as previously described.

It will also be understood that the restoration of the ratchet bar 216 to its starting position after completing its step by step movement will, through the operative connections already described, restore the bracket 206 with its arm 205 to their initial or starting position and ready to be moved step by step during the next operative cycle.

The sleeve 101, as previously described, is provided with an extension toward the left, as viewed in Fig. 10, and said extension is provided with a transverse slot in which is mounted a pivoted shoe carried by a pin secured in one end of a lever arm 248. The opposite end of this lever arm 248 is in the form of a sleeve fixed to the shaft 241, wherefore endwise movement of the sleeve 101 effects rocking movement of the shaft 241, see Figs. 10 and 14.

A gear segment 249 is fixed to the shaft 241 below the sleeve 240 and this gear segment meshes with a similar gear segment 250 fixed to the upper end of a rockable sleeve 251 rotatable on the shaft 244 and extending downwardly into the gear box 110. The sleeve 251 has fixed to its lower end a lever arm 252 which carries at its free end a pivoted shoe located in a transverse slot formed in a slidable rod 253, see Figs. 18 and 19. The rod 253 is fixed to an integral ear formed on a sleeve 254 that is slidable on a stationary rod 255 carried by the gear box see Figs. 16, 17 and 18. The sleeve 254 is provided with an integral yoke arm 256 having formed therein spaced yoke portions which engage, respectively, in annular grooves formed in the spools 139 and 143. The sleeve 254 is provided with rack teeth 257 in mesh with a pinion 258 that is rotatably supported on a bearing pin carried by the gear box, see Figs. 17 and 18. The pinion 258 is also in mesh with similar rack teeth 259 formed on a sleeve 260 that is slidably mounted on the stationary rod 261 likewise carried by the gear box. The sleeve 260 is provided with an integral yoke arm 262 which has spaced yoke portions engaging in the annular grooves in the spools 140 and 144 respectively.

It will be seen that endwise movement of the sleeve 254 on the rod 255 will shift the spools 139 and 143 endwise, while the sleeve 260 and the spools 140 and 144 will be shifted simultaneously endwise with an equalized movement but in the opposite direction with respect to the sleeve 254 and spools 139 and 143. Inasmuch as the sleeves 254 and 260 are mechanically and operatively connected with the mechanism in the headstock for shifting the spools 97 and 98 endwise, as just described, it will be seen that any shifting movement imparted to said spools will similarly shift the spools 139 and 140 and the spools 143 and 144. It will also be understood that movement of the main control lever 77 in the vertical plane effects simultaneously the endwise shifting movement of the spools of each pair of spools toward and away from each other with an equalized movement.

It will be understood that the movement of the spools of each pair of spools toward each other effects the shifting of the gearing, while the movement of the spools of each pair of spools away from each other is for the purpose of bringing the spools to a position where they may be indexed.

The machine illustrated in Figs. 1 to 20 inclusive and previously described embodies mechanism for automatically indexing the spools of all the pairs of spools to select or preselect the different spindle speeds and the different rates of feeding movement for the cross slide carriage, cross slide and turret slide. This mechanism also contains provision whereby the spools can be moved endwise by a single control lever controlling the main driving clutch to obtain the selected or preselected speeds and feeding rates and to position the spools so they may be indexed.

There may be instances, however, where it would be desirable to index the spools manually from a centralized location as, for example, for the purpose of initially setting up the machine or for the purpose of operating on a single work piece. In order to provide for such a contingency the construction illustrated in Figs. 21 to 23 inclusive may be employed in addition to the automatic mechanism already described.

When it is desired to index the spools manually the adjusting screw 238, see Fig. 11, is screwed to its most inward position to shift the wedge bar 237 to the left a distance equal to one increment of step by step movement of the ratchet bar 216, at which time all of the teeth 217 will be covered by the wedge bar, whereupon the pawl 214 cannot be operatively effective to impart a step by step shifting movement to the ratchet bar 216. When this has been done it will be seen that the pawl 214 becomes inoperative and consequently the automatic indexing of the spools will not take place. Additionally, the operator may stop the operation of the motor 176.

In order to provide for the manual indexing of the spools from a centralized station the left hand end of the shaft 99 is extended beyond the headstock and has fixed thereto a spiral gear 263, see Figs. 21 and 22. The gear 263 is in mesh with a similar gear 264 fixed to the upper end of a downwardly extending shaft 265. The shaft 265 is supported at its upper end by a bracket extension of the headstock and at its lower end by a bracket extension on the gear box 110. A spiral gear 266 similar to the gears 263 and 264 is fixed to the lower end of the shaft 265 within the bracket extension of the gear box 110 and meshes with a similar spiral gear 267 fixed to a horizontally extending indexing shaft 268 supported in the gear box and extending in front of the bed parallel to the ways thereof and through the aprons.

A graduated indexing and operating dial 269 can be rotatably secured to either of the aprons and splined on the shaft 268 or said dial can be rotatably supported by the gear box 110 and fixed to the shaft 268. It will be seen that rotation of the dial will rotate or index the spools 97 and 98 through the operative connections already referred to.

The shaft 141 which carries the spools 139 and 140 and is mounted in the gear box 110 carries on its right hand end a gear 270 which meshes with a gear 271 mounted on the left hand end of an indexing shaft 272 which extends along the front of the bed parallel to the indexing shaft 268 and through the aprons. The indexing shaft 272 is rotatably supported by a bracket secured to the gear box 110 and by suitable bearings carried by the aprons.

A graduated indexing and operating dial 273 may be rotatably supported by the apron which carries the dial 269 and is splined on the indexing shaft 272, wherefore rotation of the dial 273 will rotate through the gears 271 and 270 the shaft 141 which carries the spools 139 and 140 to index the latter. Of course the dial 273 could be rotatably supported by the gear box 110 and fixed to the shaft 141 in those instances where the dial 269 is rotatably supported by the gear box, and in such latter case the indexing shaft 272 would be omitted.

The shaft 145 which carries the spools 143 and 144 is provided on its right hand end, as viewed in Fig. 21, with a gear 274 which meshes with a similar gear 275 fixed to the left hand end of an indexing shaft 276 that also extends in front of the bed through the aprons and parallel to the shafts 268 and 272 and is supported similarly as the shaft 272. Likewise a graduated indexing and operating dial 277 may be rotatably supported by the apron which supports the dials 269 and 273 and splined to the indexing shaft 276, such that rotation of the dial 277 operates through the gears 275 and 274 to rotate the shaft 145 and index the spools 143 and 144. As in the case of the shaft 141 and dial 273 the dial 277 may be mounted directly on the right hand end of the shaft 145 and rotatably supported by the gear box, in which event, of course, the indexing shaft 276 could be omitted. It will be recalled that the power drive to the spools includes friction driving connections, consequently during manual indexing of the spools the slippage of the friction driving connections allows the manual indexing rotation to be imparted to the spools.

From the foregoing it will be apparent that the operator can manually index all of the spools either from a remote centralized station on an apron or from a centralized station on the end of the gear box, while the main control lever 77 can be moved to effect endwise movement of all of the spools.

In order to clarify the constructions which have been described heretofore an explanation of the mode of operation is now in order.

Assuming that the machine is to operate on a work piece requiring four operative steps for a complete work cycle and that the spindle speeds and rates of feeding movement for the slides have been determined, the stop pins 191 and 204 are properly positioned in the openings of the housings 188 and 201, respectively, in accordance with such spindle speeds and rates of feeding movement for the different operative steps. It should be assumed that the lock pin 230 is properly adjusted in the correct opening 229, as shown in Figs. 11 and 12 and that the adjusting screw 238 is adjusted for automatic indexing to position the wedge bar 237, as shown in Fig. 11. The machine is now set up for the performance of a complete work cycle on a work piece. The operator starts the operation of the main driving motor, not shown to drive the pulley 40 and also start the operation of the motor 176. At this time the main clutch is disengaged and the main control lever is in the full line position of Fig. 3. The operator loads a workpiece in the chuck of the spindle 38, it being understood that the proper tools are mounted on the turrets of the slides. At this time the spools are in their most inward position while the pawl 214 and the retaining pawl 234 are in the position shown in Fig. 11. Also at this time the stop arms 192 and 205 are in their inactive positions to the right of the first rows of openings in the housings 188 and 201, as indicated in Figs. 10 and 16. The operator now moves the main control lever 77 from the full line position of Fig. 3 first to dash line position A, which moves the spools of all of the pairs of spools endwise away from each other and also causes the pawl 214 to engage in the most left hand of the six teeth 217 on the upper side of the ratchet bar 216 to shift the same one increment of movement and position the stop arms 192 and 205 in the path of movement of the pins 191 and 204 mounted in the right hand row of openings in the housings 188 and 201. The operator continues the movement of the main control lever from dash line position A to dash line position B of Fig. 3, which movement results in causing rotation of the one rotation clutch, as previously described, with a consequent rotation of the housings 188 and 201 until the stop pins 191 and 204 for the first operative step abut the arms 192 and 205 thus indexing all of the spools to the proper position for the first operative step in the work cycle. The operator now moves the main control lever 77 to the full line position of Fig. 3 which moves the spools of each pair of spools endwise toward each other to cause the projections on their adjacent faces to engage with the shifting pins and effect the proper shifting of the gearing in the headstock to obtain the correct spindle speed, and the proper shifting of the shiftable keys in the gear box to obtain the correct rates of feeding movement for the first step in the cycle.

When this has been done the operator moves the main control lever horizontally to engage the main clutch, whereupon the spindle and work rotate at the desired speed while the feed shafts and apron gearing are rotated at the correct rate. The operator will now bring the cutting tools into the proper cutting position and then manipulate the feed control levers carried by the aprons in predetermined order to effect the required feeding movements for the cutting tools, it being understood that when the cutting tools have completed the cutting operation the feed control levers are either automatically or manually disengaged as is well known in the art.

The operator may wait until the first operative step has been completed and then move the main control lever 77 horizontally from clutch engaged position to neutral position to disengage the main driving clutch and then vertically from the full line position of Fig. 3 to dash line position A which moves the spools outwardly to indexing position.

It will be understood that the outward movement of the spools 97 and 98 effects, through the operative connections already described, outward movement of the spools 139, 140 and 143, 144. It will also be understood that the movement of the main control lever 77 from full line position of Fig. 3 to dash line position A effects a second one-step movement of the ratchet bar 216 through the pawl 214 with a corresponding movement of the arm 192 to position the same so as to be engaged subsequently by the stop pin 191 carried by the housing 188 in the second group of openings, when said housing is indexed for the next operative step. The movement of the arm 192 one step effects a one-step movement of the bracket 206 and the arms 205 through the operative connections previously described. This movement of the arms 205 positions the same to be engaged subsequently by the stop pins 204 for the second operative step when the housings 201 are indexed.

The vertical movement of the control lever is continued from dash line position A to dash line position B which initiates the rotation of the one rotation clutch formed of the pawl 180, ratchet 178 and sleeve 179 to effect indexing of the spools 97 and 98 and also indexing of the spools 139, 140 and 143, 144 through the operative connections already described.

It will also be recalled that when the stop pins 191 and 204 for the second operative step have engaged with the arms 192 and 205, respectively, the rotative movement of the housings 188 and 201 is stopped, but due to the friction drive to said housings the one rotation clutch can continue its movement to complete the single rotation.

It will also be recalled that after the operator has moved the control lever 77 to position B he may release the same and said lever then returns to position A under the action of the spring on the rod 182 and the spring carried by the block 211.

If the operator desires to go immediately into the second step of the cycle he will manually move the control lever downwardly from position B to position A instead of releasing said lever and continue the downward motion to the full line position and then move the lever horizontally to engage the main driving clutch. The downward movement of the main control lever from dash line position A to full line position moves the spools 97 and 98 endwise toward each other and causes the projections on the adjacent faces of said spools to engage one or more of the pins 86, 89 and 96 to shift the gears in the headstock to change the spindle speed. The endwise movement of the spools 97 and 98 toward each other causes, through the operative connections already described, equalized endwise movement of the spools 139 and 140 and the spools 143 and 144 toward each other to cause the projections on the adjacent faces of said spools to engage with the pins 138 and 142 to shift the sliding keys 130 to change the rate of rotation of the feed shafts 114 and 123 which are operatively connected with the feed trains in the aprons of the cross slide carriage and the turret slide.

In addition it will be remembered that the downward movement of the main control lever 77 from dash line position A to full line position restores the pawl 214 to a position on top of the wedge bar 237 where its next movement toward the left will impart another step movement to the ratchet bar 216.

The gear ratios of the spindle drive train in the headstock and the feed drive trains in the aprons have now been changed to the ratios desired for the second operative step, so that when the operator moves the main control lever horizontally to engage the main driving clutch the spindle will rotate at the new speed for the second operative step, and as soon as the operator engages the feed control levers on the aprons the cutting tools will feed at the feeding rate for the second operative step. This mode of operation is continued by the operator for each operative step of the cycle until the machine is operating in the final operative step which in this instance is the fourth step.

As soon as the last or fourth step in the cycle has been completed the operator moves the main control lever horizontally to neutral or clutch disengaged position to stop the operation of the machine.

The operator now moves the control lever from the full line position to dash line position A, which movement causes the pawl 214 to engage in the sixth ratchet tooth 217 on the ratchet bar 216 and shift said bar toward the left to a theoretical fifth operative position, which shifting movement brings the pin 236 into contact with the latch lever 233 to cam the retaining pawl 234 to released position as shown in Fig. 12. The pawl 214 being engaged with the sixth tooth 217 holds the ratchet bar 216 until the operator brings the control lever downwardly to full line position to have said pawl 214 engage the wedge bar 237 to disengage the pawl from the sixth ratchet tooth, whereupon the ratchet bar 216 is moved to the right by the spring 221. This movement of the ratchet bar 216 toward the right causes the right hand end of the reduced portion 223 to strike the adjustable stop pin 228 with a blow compressing the spring 226 and moving the two-part sleeve 224 a certain distance to the right. This movement of the two-part sleeve causes the ear 231, which is now engaged with the head of the pawl actuating pin 232, to move the latch lever 233 to pawl disengaged position, whereupon the retaining pawl 234 is free to move under the action of its spring 235. When this has occurred the spring 226 restores the two-part sleeve 224 and the ratchet bar 216 to their former positions, at which time the arms 192 and 205 lie in an inactive position and to the right of the path of movement of the pins 191 and 204 for the first operative step, see Figs. 10 and 16. At this time the pawl 214 is in the position shown in Fig. 11, that is it is upon the wedge bar 237 while the pawl 234 engages the under surface of the wedge bar 216.

The complete work cycle has now been completed and the parts are in their initial positions from which they function to effect the operating conditions for the first step in a new work cycle.

The operator now unloads the finished work piece and loads a new work piece in the chuck of the work spindle. When this has been done the operator raises the lever from the full line position first to dash line position A to bring all of the spools outwardly to indexing position and to effect the one step movement of the stop arms 192 and 204 from the inactive position into line with the stop pins 191 and 204 for the first operative step. The operator continues the movement of the main control lever from dash line position A to dash line position B which initiates the rotation of the single rotation clutch to index the housings 188 and 201 and in turn all of the spools. The operator then moves the main control lever from dash line position B downwardly through A to full line position to bring the spools of all of the pairs of spools endwise toward each other to obtain a change in the gear ratios in accordance with the speeds and feed rates for the first operative step, after which he moves the control lever horizontally to engage the main driving clutch.

The spindle is now rotating at the spindle speed for the first operative step and as soon as the operator engages the feed control levers the cutting tools will be fed at the feed rates for the first operative step of the new work cycle. In this way the operator by imparting the movements to the control lever hereinbefore described can operate the machine through the different steps of a number of complete work cycles.

Although the description of the operation of the machine has set forth that the operator does not move the control lever 77 to index the spools until the completion of each operative step in the cycle, it will be understood that the operator could perform these movements during the operation of the machine in one step and thus preselect the spindle speeds and feeding rates for the next successive step.

In operating the machine to preselect the spindle speeds and the different feed rates the operator may move the main control lever 77 when in the clutch engaged position and while the spindle is rotating at the speed for one step first vertically to a position corresponding to position A, and then vertically to a position corresponding to position B, after which he releases the lever and the same returns automatically to said first named position corresponding to position A. The spools have now been moved outwardly and indexed in accordance with the feeds and speeds for the next operative step. In other words when the machine is operated to preselect the speeds and feeds the spools will be moved outwardly and indexed during one operative step in accordance with the speeds and feeds desired for the following operative step.

Upon the completion of the current operative step the operator merely moves the main control lever horizontally from the position corresponding to dash line position A to neutral or clutch disengaged position (dash line position A of Fig. 3), and then downwardly to full line position of Fig. 3 to cause the spools of the pairs of spools to move endwise toward each other and obtain the preselected changes in the gear ratios, after which he moves the control lever horizontally to clutch engaged position and thence upwardly through the position corresponding to position A to the position corresponding to position B, after which he releases the lever and it returns to said first named upward position. At this time the spindle is rotating at the proper speed for the new operative step, while the movement of the control lever vertically, as just referred to, has preselected the speeds and feeds for the next successive operative step in the cycle.

It will be understood that a complete work cycle may include a lesser number of operative steps than the four steps described herein as, for example, if the complete work cycle consists of two operative steps the stop pin 228 will be adjusted so that the lock pin 230 is located in the second opening 229 from the outer end of the pin, thus positioning the inner end of the stop pin more closely adjacent to the right hand end of the reduced portion 223 projecting from the ratchet bar 216. The inactive position of the ratchet bar 216 is determined by the engagement of the end of the reduced portion 223 with the inner end of the stop pin 228 which means that the arm 192 in its inactive position will lie to the right of the path of movement of the two left hand groups of openings in the housing 188 and that no stop pins 191 are mounted in the other groups of openings in said housing. The same is true with respect to the stop arms 205, the housings 201 and the groups of openings in said housings. Therefore when the machine is operating in a work cycle consisting of two operative steps the first two increments of movement imparted to the stop arms and to the ratchet bar 16 by the movement of the pawl 214 will position said stop arms first in position to be engaged by the stop pins mounted in the group of openings for the first operative step, and then by the stop pins mounted in the group of openings for the second operative step, i. e., the most left hand group of openings. A third increment of movement to a theoretical third position is imparted to the ratchet bar 216 and the arms 192 and 205 in order to withdraw the retaining pawl 234 and restore the ratchet bar 216 to its initial position.

Although for purposes of illustration the machine shown and described herein is designed for a work cycle of four operative steps, it will be understood that the number of operative steps in the work cycle can be greater than four if desired, in which event the groups of openings for the stop pins would correspond to the desired number of operative steps, while the ratchet bar will have sufficient teeth 217 to provide for the necessary increments of movement for the greater number of operative steps. Likewise the stop pin 228 will be provided with openings corresponding in number to the greater number of operative steps.

As already explained the manual indexing of the spools by the arrangement shown in Figs. 21 to 23 inclusive can be utilized for the purpose of setting up the machine for automatic indexing or it can be used when the number of work pieces to be machined would not warrant setting up the machine for automatic indexing. In utilizing the mechanism for manually indexing the spools the adjusting screw 238 is screwed inwardly to its most inward position to so position the wedge bar 237 as to render the pawl 214 inactive to eliminate the step by step movement of the ratchet bar 216, which, of course, results in the arms 192 and 205 remaining in their inoperative positions to the right of the first circular row of openings in the indexible housings.

Although a preferred embodiment of the invention has been illustrated herein it will be understood that the invention is susceptible of various modifications and adaptations within the scope of the appended claims.

Having thus described my invention I claim:

1. A machine tool having a plurality of movable members, an individual change speed transmission for each member with each transmission mounted in a stationary part of the machine, a separate means operatively associated with each transmission and each mounted in the respective stationary part of the machine and each indexible to select or preselect the rates of movement for its respective member and actuatable to obtain the selected or preselected rates, a single control member, and operative connections between said control and each of said separate means for actuating the latter to obtain the selected or preselected rates of movement for all of said members.

2. A machine tool having a plurality of slidable members, an individual change speed transmission for each member with each transmission mounted in a stationary part of the machine, a separate means operatively associated with each transmission and each mounted in the respective stationary part of the machine and each indexible to select or preselect the rates of movement for its respective member and actuatable to obtain the selected or preselected rates, a single control member, and operative connections between said control member and each of said separate means for actuating the latter to obtain the selected or preselected rates of movement for all of said slidable members.

3. A machine tool having a plurality of movable members, an individual change speed transmission for each member, a separate means operatively associated with each transmission and indexible to select or preselect the rates of movement for its respective member and actuatable to obtain the selected or preselected rates, all of said separate means being carried by a stationary part of the machine, a single control member carried by said stationary part, and operative connections between said control member and each of said separate means for actuating the latter to obtain the selected or preselected rates of movement for said movable members.

4. A machine tool having a plurality of slidable members, an individual change speed transmission for each member, a separate means operatively associated with each transmission and indexible to select or preselect the rates of movement for its respective slidable member and actuatable to obtain the selected or preselected rates, all of said separate means being carried by a stationary part of the machine, a single control member carried by said stationary part, and operative connections between said control member and each of said separate means for actuating the latter to obtain the selected or preselected rates of movement for said slidable members.

5. A machine tool having a rotatable member and a slidable member movable relative to each other, an individual change speed transmission for moving each of said members and carried by a stationary part of the machine, a separate means operatively associated with each of said transmissions and carried by said stationary part and indexible to select or preselect the rates of movement for its respective member and actuatable to obtain the selected or preselected rates of movement, a single control member, and operative connections between said control member and each of said separate means for actuating the latter to obtain the selected or preselected rates of movement.

6. A machine tool having a plurality of movable members, an individual change speed transmission for moving each of said members and carried by a stationary part of the machine, power means for operating all of said transmissions, means for connecting and disconnecting said transmissions with respect to said power means, a separate means operatively associated with each of said transmissions and carried by said stationary part and indexible to select or preselect the rates of movement for its respective member and actuatable to obtain the selected or preselected rates of movement, a single control member, and operative connections between said control member and each of said separate means for actuating the latter to obtain the selected or preselected rates of movement and between said control members and said means for connecting and disconnecting all of said transmissions and said power means.

7. A machine tool having a plurality of movable members, an individual change speed transmission for moving each of said members, a separate means operatively associated with each of said transmissions and indexible to select or preselect the rates of movement for its respective member and actuatable to obtain the selected or preselected rates of movement, all of said separate means being mounted in a stationary part of the machine, mechanism for indexing said separate means, and a single control member, operative connections between said control member and said mechanism wherefore said control member controls the latter, and operative connections between said control member and all of said separate means wherefore said control member actuates all of said separate means to obtain the selected or preselected rates of movement.

8. A machine tool having a plurality of movable members, an individual change speed transmission for moving each of said members, a separate means operatively associated with each of said transmissions and indexible to select or preselect the rates of movement for its respective member and actuatable to obtain the selected or preselected rates of movement, all of said separate means being mounted in a stationary part of the machine, a step by step movable element for each of said separate means, the positions of said elements determining the different indexed positions of each of said separate means, a single control member, operative connections between said control member and each of said elements wherefore said control member controls the latter to control the indexing of said separate means, and operative connections between said control member and each of said separate means to obtain the selected or preselected rates of movement.

9. A machine tool having a plurality of movable members, an individual change speed transmission for moving each of said members each carried by a stationary part of the machine, a separate means operatively associated with each of said transmissions and indexible to select or preselect the rates of movement for its respective member and actuatable to obtain the selected or preselected rates of movement, power operated mechanism for indexing said separate means, a single control member, operative connections between said control member and said mechanism wherefore said control member controls the latter, and operative connections between said control member and each of said separate means wherefore said control member actuates said separate means to obtain the selected or preselected rates of movement.

10. A machine tool having a plurality of movable members, an individual change speed transmission for moving each of said members, a separate means operatively associated with each of said transmissions and indexible to select or preselect the rates of movement for its respective member and actuatable to obtain the selected or preselected rates of movement, all of said separate means being mounted in a stationary part of the machine, mechanism for imparting indexing movement to said separate means, step by step movable elements for arresting said indexing movement of said separate means in predetermined indexed positions, a single control member, operative connections between said control member and said mechanism wherefore said control member controls the latter, operative connections between said control member and each of said separate means wherefore said control member actuates said separate means to obtain the selected or preselected rates of movement, and operative connections between said control member and said elements wherefore said control member actuates said elements.

11. A machine tool having a plurality of movable members, an individual change speed transmission for moving each of said members, all of said transmissions being mounted in a stationary part of the machine, a separate means adjacent to and operatively associated with each of said transmissions and indexible to select or preselect the rates of movement for its respective member and actuatable to obtain the selected or preselected rates of movement, a separate mechanism adjacent to and operatively associated with each of said separate means for indexing the latter, and operative connections between said separate mechanisms to effect simultaneous operation of all of said mechanisms.

12. A machine tool having a plurality of movable members, an individual change speed transmission for moving each of said members, all of said transmissions being mounted in a stationary part of the machine, a separate means adjacent to and operatively associated with each of said transmissions and indexible to select or preselect the rates of movement for its respective member and actuatable to obtain the selected or preselected rates of movement, a separate step by step shiftable element adjacent to and operatively connected with each of said separate means for locating the latter in predetermined indexed positions, and operative connections between said elements to effect simultaneous shifting movement thereof.

13. A machine tool having a plurality of movable members, an individual change speed transmission for moving each of said members, all of said transmissions being mounted in a stationary part of the machine, a separate means adjacent to and operatively associated with each of said transmissions and indexible to select or preselect the rates of movement for its respective member and actuatable to obtain the selected or preselected rates of movement, a separate actuating mechanism for each of said separate means and located adjacent to the latter, and operative connections between said separate actuating mechanisms to effect simultaneous operation of the same.

14. A machine tool having a plurality of movable members, an individual change speed transmission for moving each of said members, all of said transmissions being mounted in a stationary part of the machine, a separate means adjacent to and operatively associated with each of said transmissions and indexible to select or preselect the rates of movement for its respective member and actuatable to obtain the selected or preselected rates of movement, a separate mechanism adjacent to and operatively associated with each of said separate means for indexing the same, operative connections between said separate mechanisms to effect simultaneous operation of the same, a separate actuating mechanism adjacent to and operatively associated with each of said separate means to actuate the latter, and operative connections between said separate actuating mechanisms to effect simultaneous operation thereof.

15. A machine tool having a plurality of movable members, an individual change speed transmission for moving each of said members, all of said transmissions being mounted in a stationary part of the machine, a separate means adjacent to and operatively associated with each of said transmissions and indexible to select or preselect the rates of movement for its respective member and actuatable to obtain the selected or preselected rates of movement, a separate independently supported indexing mechanism and adjacent to and operatively associated with each of said separate means, operative connections between said separate indexing mechanisms to effect simultaneous operation of the same, a separate step by step shiftable mechanism adjacent to and operatively associated with each of said indexing mechanisms to arrest movement thereof and to locate the separate means in predetermined indexed positions, and operative connections between said separate step by step shiftable mechanisms to effect simultaneous operation thereof.

16. A machine tool having a plurality of movable members, an individual change speed transmission for moving each of said members, all of said transmissions being mounted in a stationary part of the machine, a separate means adjacent to and operatively associated with each of said transmissions and indexible to select or preselect the rates of movement for its respective member and actuatable to obtain the selected or preselected rates of movement, a separate indexing mechanism adjacent to and operatively associated with each of said separate means, operative connections between said indexing mechanisms to effect simultaneous operation thereof, a separate step by step shiftable element adjacent to and operatively associated with each of said indexing mechanism to arrest movement thereof and to locate the separate means in predetermined indexed positions, operative connections between said elements to effect simultaneous operation thereof, a separate actuating means adjacent to and operatively associated with each of said separate means, and operative connections between said actuating means to effect simultaneous operation thereof.

17. A machine tool having a rotatable spindle carried by one end of the bed of the machine, a change speed transmission for said spindle carried by said end of said bed, a slide movable on the bed, a change speed transmission for said slide carried by said end of said bed, operative connections between said transmissions, a separate means adjacent to and operatively associated with each of said transmissions and indexible to select or preselect the rates of movement for said spindle or said slide respectively and actuatable to obtain the selected or preselected rates of movement, a separate indexing mechanism adjacent to and operatively associated with each of said separate means, operative connections between said indexing mechanisms to effect simultaneous operation thereof, a separate step by step shiftable element adjacent to and operatively associated with each of said indexing mechanisms to arrest movement thereof and to locate said separate means in predetermined indexed positions, operative connections between said shiftable elements to effect simultaneous operation thereof, a separate actuating mechanism adjacent to and operatively associated with each of said separate means, and operative connections between said separate actuating mechanisms to effect simultaneous operation thereof.

18. A machine tool having a rotatable spindle, a change speed transmission for said spindle mounted in a stationary part of the machine, a slide, a change speed transmission for said slide mounted on said stationary part, operative connections between said transmissions, a separate means adjacent to and operatively associated with each of said transmissions and indexible to select or preselect the rates of movement for said spindle or said slide respectively and actuatable to obtain the selected or preselected rates of movement, a separate indexing mechanism adjacent to and operatively associated with each of said separate means, operative connections between said indexing mechanisms to effect simultaneous operation thereof, a separate step by step shiftable element adjacent to and operatively associated with each of said indexing mechanism to arrest movement thereof and to locate the separate means in predetermined indexed positions, operative connections between said shiftable elements to effect simultaneous operation thereof, a separate actuating mechanism adjacent to and operatively associated with each of said separate means, operative connections between said separate actuating mechanisms to effect simultaneous operation thereof, a single control member, and operative connections between said control member and with said indexing mechanisms, said shiftable elements and said actuating mechanisms wherefore said control member controls said indexing mechanisms and operates said shiftable elements and said actuating mechanisms.

19. A machine tool having a plurality of movable members, an individual change speed transmission for moving each of said members and carried by a stationary part of the machine, a separate means adjacent to and operatively associated with each of said transmissions and indexible to select or preselect the rates of movement for its respective member and actuatable to obtain the selected or preselected rates of movement, a separate mechanism for imparting indexing movement to each of said separate means and each located adjacent to its respective separate means and each including a shaft, a housing rotatable thereon and provided with adjustable stops arranged in predetermined position thereon, and a friction driving connection between said shaft and housing; a separate step by step moveable element for each of said mechanisms and each located adjacent to its respective mechanism and cooperating with said stops for arresting indexing movement of said housing in predetermined indexed positions, a single control member, and operative connections between said control member and all of said mechanisms, all of said elements and all of said separate means wherefore said control member controls said mechanisms and actuates said elements and said separate means.

20. A machine tool having a plurality of movable members, an individual change speed transmission for moving each of said members and mounted in a stationary part of the machine, a separate means adjacent to and operatively associated with each of said transmissions and indexible to select or preselect the rates of movement for its respective member and actuatable to obtain the selected or preselected rates of movement, a step by step movable element for each of said separate means and located adjacent to its respective separate means, the positions of said elements determining the different indexed positions of said separate means for the different operative steps of a complete work cycle, operative connections between all of said elements, a common means operatively associated with all said separate elements for restoring the same simultaneously to their initial positions upon the completion of a complete work cycle, a single control member, operative connections between said control member and all of said elements, all of said separate means and with said common restoring means wherefore said control member actuates said elements and said separate means and controls said restoring means to effect restoration of said elements to their initial positions upon the completion of the work cycle.

21. A machine tool having a plurality of movable members, an individual change speed transmission for moving each of said members, a separate means operatively associated with each of said transmissions and indexible to select or preselect the rates of movement for its respective member and actuatable to obtain the selected or preselected rates of movement, all of said separate means being mounted in a stationary part of the machine, power operated mechanisms for indexing said separate means, a step by step movable element operatively associated with each of said mechanisms to arrest movement thereof and to locate the separate means in predetermined indexed positions, means for rendering said elements inactive, means for manually indexing said separate means when said elements are rendered inactive, and a single control member operatively connected with all of said mechanisms, all of said elements and all of said separate means for controlling said mechanisms and for actuating said elements and said separate means.

22. In a machine tool having a bed, a rotatable member and a slidable member mounted thereon, a change speed transmission for said rotatable member, a separate change speed transmission for said slidable member and mounted on the bed independently thereof, operative connections between said transmissions, a power source, means for connecting and disconnecting said power source and said transmissions, separate means located adjacent to and operatively connected with said transmissions and indexible to select or preselect the rates of movement for said members and actuatable to obtain the selected or preselected rates of movement, separate mechanisms for imparting indexing movement to each of said separate means and each mechanism located adjacent to its respective separate means, operative connections between said separate mechanisms for causing simultaneous operation thereof, each of said separate mechanisms including driving and driven members having a friction driving connection therebetween, a power operated means for driving said mechanisms, a one rotation clutch for connecting said power operated means and said mechanisms, said mechanisms each including adjustable stops, a separate step by step movable element for each of said mechanisms and each located adjacent to its respective mechanism and cooperating with said stops for arresting indexing movement of said mechanism when said separate means is in predetermined indexed position, operative connections between said elements for simultaneous operation thereof, means for actuating each of said separate means, operative connections between said last named means for simultaneous operation thereof, a single control member, and operative connections between said control member, said first named means, said one rotation clutch, said mechanisms, said elements and said actuating means wherefore movement of said control member controls said first named means and said one rotation clutch and said mechanisms and actuates said elements and said actuating means.

MAX E. LANGE.